US012645171B2

(12) United States Patent
Mitsumata

(10) Patent No.: US 12,645,171 B2
(45) Date of Patent: Jun. 2, 2026

(54) CARTRIDGE AND IMAGE FORMING APPARATUS WITH FILTER HAVING A PORTION SANDWICHED BETWEEN AN INCLINED SURFACE AND A SANDWICHING SURFACE OF TWO CONTAINERS

(71) Applicant: CANON KABUSHIKI KAISHA, Tokyo (JP)

(72) Inventor: Akinori Mitsumata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/897,758

(22) Filed: Sep. 26, 2024

(65) Prior Publication Data

US 2025/0102954 A1 Mar. 27, 2025

(30) Foreign Application Priority Data

Sep. 27, 2023 (JP) ................................ 2023-166578

(51) Int. Cl.
*G03G 15/08* (2006.01)
*B65D 83/06* (2006.01)

(52) U.S. Cl.
CPC ......... *G03G 15/0879* (2013.01); *B65D 83/06* (2013.01); *G03G 15/0875* (2013.01); (Continued)

(58) Field of Classification Search
CPC ........... G03G 15/0879; G03G 15/0865; G03G 2215/068; G03G 2215/0685; B65D 25/38; (Continued)

(56) References Cited

U.S. PATENT DOCUMENTS 4,338,878 A * 7/1982 Mason .................... B05C 19/02 118/DIG. 5
4,990,964 A * 2/1991 Kraehn ................ G03G 15/087 222/DIG. 1
(Continued)

FOREIGN PATENT DOCUMENTS

JP 2000147884 A 5/2000
JP 2003323034 A 11/2003
(Continued)

*Primary Examiner* — Robert B Beatty
(74) *Attorney, Agent, or Firm* — Canon U.S.A., Inc. IP Division

(57) ABSTRACT

A cartridge includes a first container, a filter, a second container for housing toner, and a pipe. The filter includes a partition between the first container and the second container and a held portion. With a direction in which the first and second containers align defined as a first direction, and directions perpendicular to each other on a cross-section perpendicular to the first direction defined as a second direction and a third direction, when the cartridge is positioned in an orientation in which the second chamber is above the first chamber, one of the first container and the second container includes an inclined surface that descends toward the opposing region, as viewed in the third direction, with a decreasing distance from the opposing region in the second direction, and the other container includes a holding surface. The held portion includes a first held part extending in the second direction.

19 Claims, 19 Drawing Sheets

(52) U.S. Cl.
CPC ................ *B65D 2585/6892* (2013.01); *G03G 2215/068* (2013.01)

(58) Field of Classification Search
CPC ............. B65D 83/06; B65D 2585/6892; B01J 8/1845; B07B 4/00; B07B 4/08; B05C 19/02; Y10S 118/05
USPC ......... 399/258, 262; 222/189.09, 189.1, 325, 222/335, 373, 382, 383.1, 394, 399, 405, 222/630, DIG. 1
See application file for complete search history.

(56) References Cited

U.S. PATENT DOCUMENTS

| | | | | |
|---|---|---|---|---|
| 6,383,706 | B1 * | 5/2002 | Kumar | B02C 19/068 241/5 |
| 6,679,301 | B2 * | 1/2004 | Makino | B65G 53/22 222/189.1 |
| 9,665,064 | B1 * | 5/2017 | Kim | G03G 21/1676 |
| 10,293,378 | B2 * | 5/2019 | She | B01J 8/26 |
| 2003/0111131 | A1 * | 6/2003 | Zhu | B01J 8/0035 141/18 |
| 2003/0170049 | A1 * | 9/2003 | Itoh | G03G 15/0855 399/258 |
| 2006/0024101 | A1 * | 2/2006 | Schoch | G03G 15/0865 399/358 |
| 2006/0266284 | A1 * | 11/2006 | Fritz | B07B 1/346 209/244 |
| 2007/0201905 | A1 * | 8/2007 | Sano | G03G 15/0875 399/258 |
| 2007/0223945 | A1 * | 9/2007 | Chiba | G03G 15/0879 399/258 |
| 2007/0242983 | A1 * | 10/2007 | Sano | G03G 15/0865 399/258 |
| 2008/0213003 | A1 * | 9/2008 | Sano | G03G 15/0855 399/258 |
| 2013/0216270 | A1 * | 8/2013 | Yamabe | G03G 15/0887 399/258 |
| 2025/0102952 | A1 * | 3/2025 | Mitsumata | G03G 15/0887 |
| 2025/0271790 | A1 * | 8/2025 | Hayashida | G03G 15/2064 |

FOREIGN PATENT DOCUMENTS

| | | | |
|---|---|---|---|
| JP | 2017072849 | A | 4/2017 |
| JP | 2020154300 | A | 9/2020 |
| JP | 2021006873 | A | 1/2021 |

* cited by examiner

CARTRIDGE AND IMAGE FORMING APPARATUS WITH FILTER HAVING A PORTION SANDWICHED BETWEEN AN INCLINED SURFACE AND A SANDWICHING SURFACE OF TWO CONTAINERS

BACKGROUND

Field

The present disclosure relates to cartridges for housing toner and an image forming apparatus including the same.

Description of the Related Art

Electrophotographic image forming apparatuses generally form images by transferring toner images formed on the surfaces of photosensitive drums onto transfer materials serving as transfer media. Examples of known developer replenishment methods include a process cartridge method and a toner replenishment method. The process cartridge method integrates the photosensitive drum and the developer container into a process cartridge, and when the developer runs out, the process cartridge is replaced with a new one.

The toner replenishment method is for newly supplying the developer container with toner when the toner runs out. An image forming apparatus has been proposed which replenishes the developer container with toner using a toner pack detachable to the developer container (see Japanese Patent Laid-Open No. 2020-154300).

An image forming apparatus has been proposed which includes a developing unit that contains toner, a toner container that contains the toner to be supplied to the developing unit, and an air pump that pumps air to the toner container (see Japanese Patent Laid-Open No. 2000-147884). This image forming apparatus includes an air filter that permits only air, among the toner and air supplied from the toner container to the developing unit, to be sent to the outside of the developing unit.

SUMMARY

A cartridge includes a first container including a container opening communicating with outside of the cartridge, a filter constituting a first chamber together with the first container, the filter being configured to prevent passage of toner and permit passing of air, a second container constituting a second chamber for housing toner together with the filter, and a pipe including a first pipe opening that faces a predetermined region of the filter with a gap therebetween and opens toward the predetermined region of the filter and a second pipe opening communicating with the outside of the cartridge, the pipe extending from the first pipe opening to the second pipe opening, wherein the filter includes a partition between the first chamber and the second chamber and a sandwiched portion sandwiched by the first container and the second container, wherein, with a direction in which the first container and the second container align defined as a first direction, and directions perpendicular to each other on a cross-section perpendicular to the first direction defined as a second direction and a third direction, the first direction being a direction of gravity, in a case where the cartridge is oriented in a predetermined direction in which the second chamber is above the first chamber, one of the first container and the second container includes an inclined surface that is inclined toward the predetermined region of the filter located lower in the first direction, as viewed in the third direction, as approaches the predetermined region in the second direction, the other of the first container and the second container includes a sandwiching surface, and the sandwiched portion of the filter includes a first sandwiched part extending in the second direction, the first sandwiched part being sandwiched between the inclined surface and the sandwiching surface along the inclined surface.

Further features of the present disclosure will become apparent from the following description of exemplary embodiments with reference to the attached drawings.

DESCRIPTION OF THE EMBODIMENTS

First Embodiment

Overall Configuration

First, a first embodiment of the present disclosure will be described. An image forming apparatus 1 according to the first embodiment is an electrophotographic laser beam printer. Examples of the image forming apparatus include a printer, a copying machine, a facsimile machine, and a multifunction machine that form images on sheets used as recording media based on image information input from an external personal computer (PC) or image information read from a document. The image forming apparatus may include, in addition to the main body having an image forming function, an optional feeder, an image scanner, a sheet processor, and other ancillary equipment connected thereto. The entire system connected to such ancillary equipment is also a form of image forming apparatus.

Figure 1:
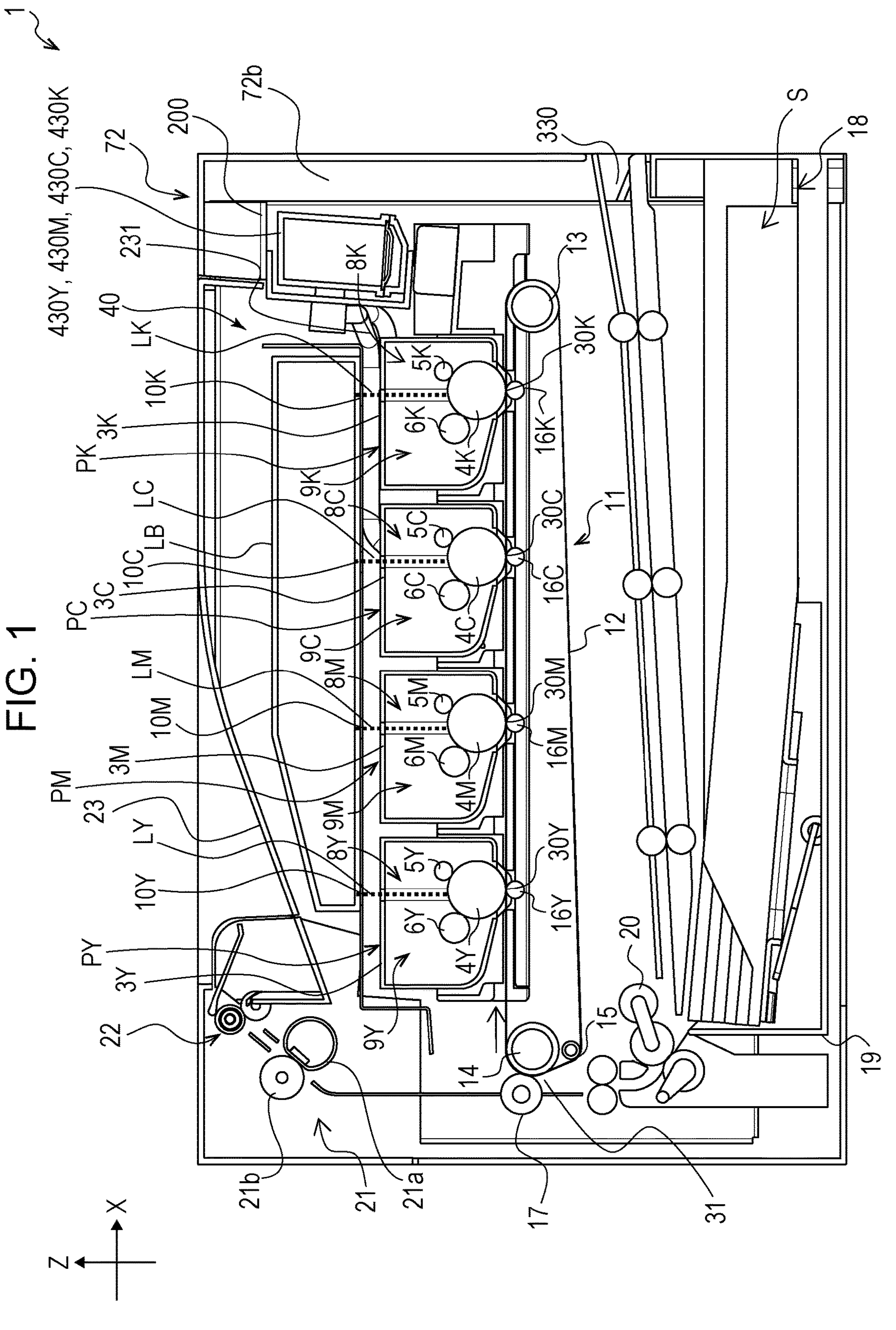
FIG. 1 is a diagram illustrating, in outline, the configuration of an image forming apparatus according to a first embodiment.

As illustrated in FIG. 1, the image forming apparatus 1 includes an image forming unit 40 that forms images on sheets S, a feeding unit 18, a fixing unit 21, and a discharge roller pair 22. The image forming unit 40 includes four process cartridges PY, PM, PC, and PK that form toner images of four colors, yellow (Y), magenta (M), cyan (C), and black (K), respectively, and a laser scanner LB. The laser scanner LB is disposed above the process cartridges PY, PM, PC, and PK. Instead of the laser scanner LB, a light-emitting diode (LED) exposure unit may be applied.

The portion of the image forming apparatus 1 excluding the process cartridges PY, PM, PC, and PK and toner cartridges 430Y, 430M, 430C, and 430K (described below) is sometimes referred to as the main body of the image forming apparatus 1 or an apparatus body 72. In the following description, the toner cartridges 430Y, 430M, 430C, and 430K are sometimes simply referred to as cartridges 430Y, 430M, 430C, and 430K. The process cartridges PY, PM, PC, and PK may be detachably supported by the apparatus body 72 or may be undetachably fixed to the apparatus body 72.

In this embodiment, components corresponding to the yellow, magenta, cyan, and black toners are denoted by signs with subscripts Y, M, C, and K, respectively. The configurations and operations of the components with such subscripts are substantially the same except that the colors of the toners differ. Accordingly, unless particular distinction is needed, the components may be collectively described, with the subscripts Y to K omitted.

In the following description, the directions (X, Y, Z) are defined as follows, unless otherwise specified, on the assumption that the process cartridges PY, PM, PC, and PK and the toner cartridges 430Y, 430M, 430C, and 430K assume their normal positions, that is, orientations when attached to the apparatus body 72.

Figure 2A:
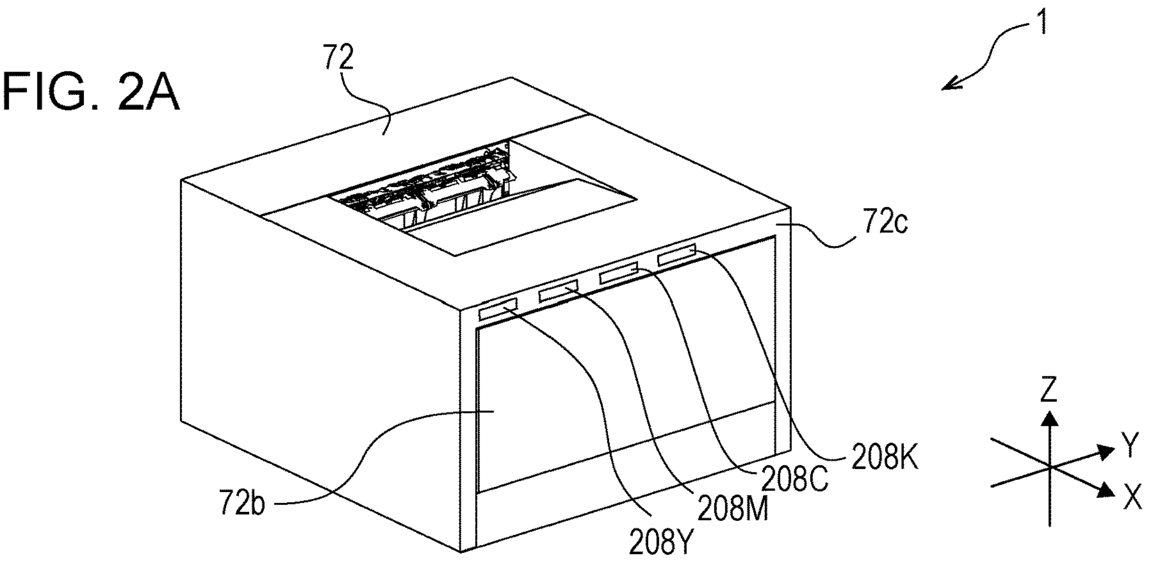
FIG. 2A is a perspective view of the image forming apparatus.

As illustrated in FIG. 2A, the front-back direction is indicated by the X-axis, and the direction from the back to the front of the image forming apparatus 1 is defined as the X-direction. The X-direction is sometimes referred to as the forward direction or the front-side direction. The downstream side of the image forming apparatus 1 in the X-direction is sometimes referred to as the front side, and the upstream side is sometimes referred to as the back side.

The lateral direction is indicated by the Y-axis, and the direction from the left to the right of the image forming apparatus 1 is defined as the Y-direction. The Y-direction is sometimes referred to as the rightward direction. The downstream side of the image forming apparatus 1 in the Y-direction is sometimes referred to as the right side, and the upstream side is sometimes referred to as the left side.

The vertical direction is indicated by the Z-axis, and the direction from below to above the image forming apparatus 1 is defined as the Z-direction.

The Z-direction is sometimes referred to as the upward direction, the height direction, or the vertical direction. The downstream side of the image forming apparatus 1 in the Z-direction is sometimes referred to as the upside, the upper surface side, or the top side, and the upstream side is sometimes referred to as the downside, the lower surface side, or the bottom side.

The X-axis, the Y-axis, and the Z-axis are perpendicular to one another. For example, the X-axis is perpendicular to the Y-axis and also to the Z-axis. A plane perpendicular to the X-axis is sometimes referred to as the Y-Z plane, a plane perpendicular to the Y-axis is sometimes referred to as the Z-X plane, and a plane perpendicular to the Z-axis is sometimes referred to as the X-Y plane. For example, the X-Y plane is a horizontal plane. The X-direction and the Y-direction are directions along the horizontal X-Y plane, that is, horizontal directions.

The process cartridge PY includes a drum unit 8Y and a developing unit 9Y. The drum unit 8Y includes a photosensitive drum 4Y and a charging roller 5Y. The photosensitive drum 4Y is formed by applying an organic photoconductive layer around an aluminum cylinder and is rotated by a drive motor (not shown). Instead of the photosensitive drum 4Y, a photosensitive belt may be used. The developing unit 9Y includes a developer container 3Y that contains a yellow toner and a developing roller 6Y that develops an electrostatic latent image on the photosensitive drum 4Y.

Similarly, the process cartridge PM includes a drum unit 8M and a developing unit 9M. The drum unit 8M includes a photosensitive drum 4M and a charging roller 5M. The photosensitive drum 4M is formed by applying an organic photoconductive layer around an aluminum cylinder and is rotated by a drive motor (not shown). Instead of the photosensitive drum 4M, a photosensitive belt may be used. The developing unit 9M includes a developer container 3M that contains a magenta toner and a developing roller 6M that develops an electrostatic latent image on the photosensitive drum 4M.

The process cartridge PC includes a drum unit 8C and a developing unit 9C. The drum unit 8C includes a photosensitive drum 4C and a charging roller 5C. The photosensitive drum 4C is formed by applying an organic photoconductive layer around an aluminum cylinder and is rotated by a drive motor (not shown). Instead of the photosensitive drum 4C, a photosensitive belt may be used. The developing unit 9C includes a developer container 3C that contains a cyan toner and a developing roller 6C that develops an electrostatic latent image on the photosensitive drum 4C.

The process cartridge PK includes a drum unit 8K and a developing unit 9K. The drum unit 8K includes a photosensitive drum 4K and a charging roller 5K. The photosensitive drum 4K is formed by applying an organic photoconductive layer around an aluminum cylinder and is rotated by a drive motor (not shown). Instead of the photosensitive drum 4K, a photosensitive belt may be used. The developing unit 9K includes a developer container 3K that contains a black toner and a developing roller 6K that develops an electrostatic latent image on the photosensitive drum 4K.

These four process cartridges PY, PM, PC, and PK are arranged side by side in the X-direction. The image forming unit 40 includes an intermediate transfer belt unit 11 located below the process cartridges PY, PM, PC, and PK. The intermediate transfer belt unit 11 includes an intermediate transfer belt 12 wound around a drive roller 14, a tension roller 13, and an assist roller 15, and a secondary transfer roller 17. The intermediate transfer belt 12 is rotated clockwise in FIG. 1 by the drive roller 14. Primary transfer rollers 16Y, 16M, 16C, and 16K are provided inside the intermediate transfer belt 12.

The primary transfer rollers 16Y, 16M, 16C, and 16K are in contact with the photosensitive drums 4Y, 4M, 4C, and 4K to form primary transfer sections 30Y, 30M, 30C, and 30K, respectively. The secondary transfer roller 17 is opposed to the drive roller 14 with the intermediate transfer belt 12 therebetween. The secondary transfer roller 17 and the intermediate transfer belt 12 are in contact with each other to form a secondary transfer section 31.

The fixing unit 21 includes a fixing film 21*a* heated by a heater and a pressure roller 21*b* that is in pressure contact with the fixing film 21*a*. The feeding unit 18 is provided at the lower part of the image forming apparatus 1. The feeding unit 18 includes a sheet cassette 19 detachable and attachable from/to the apparatus body 72 and a feed roller 20 that feeds the sheets S housed in the sheet cassette 19. The feeding unit 18 includes a manual feed port 330 into which sheets are manually inserted. Examples of the sheets include paper such as envelope paper, plastic films such as overhead projector (OHP) sheets, and cloth.

Image Forming Operation

Next, the image forming operation of the image forming apparatus 1 configured in this manner will be described. When an image signal is input to the laser scanner LB from a personal computer or the like (not shown), the laser scanner LB emits laser beams LY, LM, LC, and LK, corresponding to the image signal, onto the photosensitive drums 4Y, 4M, 4C, and 4K.

The surface of the photosensitive drum 4Y is uniformly charged to a predetermined polarity/potential in advance by the charging roller 5Y, and by the application of the laser beam LY from the laser scanner LB, an electrostatic latent image is formed on the surface. The electrostatic latent image formed on the photosensitive drum 4Y is developed by the developing roller 6Y, and a yellow (Y) toner image is formed on the photosensitive drum 4Y.

Similarly, magenta (M), cyan (C), and black (K) toner images are formed on the photosensitive drums 4M, 4C, and 4K, respectively. The individual color toner images formed on the photosensitive drums 4Y, 4M, 4C, and 4K are transferred onto the intermediate transfer belt 12 by the primary transfer rollers 16Y, 16M, 16C, and 16K, respectively, and are conveyed to the secondary transfer roller 17 by the intermediate transfer belt 12 rotated by the drive roller 14.

The image forming processes for the individual colors are performed at the timing when the color toner images are superimposed on the upstream toner images that are primarily transferred onto the intermediate transfer belt 12. After the toner images of the individual colors are transferred onto the intermediate transfer belt 12, the toner remaining on the surfaces of the photosensitive drums 4Y, 4M, 4C, and 4K are removed by a cleaning device (not shown).

In parallel to the image forming processes, the sheets S housed in the sheet cassette 19 of the feeding unit 18 or the sheets supplied through the manual feed port 330 are conveyed toward the secondary transfer section 31. At the secondary transfer section 31, a full-color toner image on the intermediate transfer belt 12 is transferred to each sheet S by the secondary transfer bias applied to the secondary transfer roller 17. The sheet S onto which the toner image has been transferred is subjected to a predetermined amount of heat and pressure by the fixing film 21*a* and the pressure roller 21*b* of the fixing unit 21, causing the toner to be melted and firmly fixed. The sheet S that has passed through the fixing unit 21 is discharged in the direction along the X-direction by the discharge roller pair 22 and loaded on a discharge tray 23 provided at the upper part of the apparatus body 72.

Schematic Configuration of Toner Cartridge

Figure 2B:
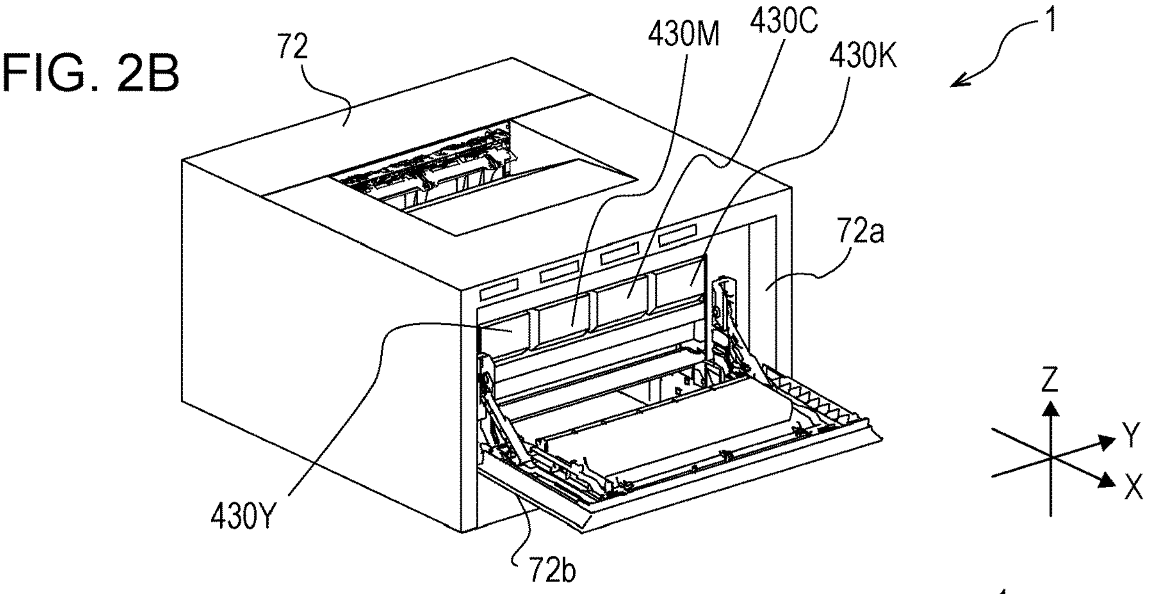
FIG. 2B is a perspective view of the image forming apparatus, with a front door opened.
Figure 2C:
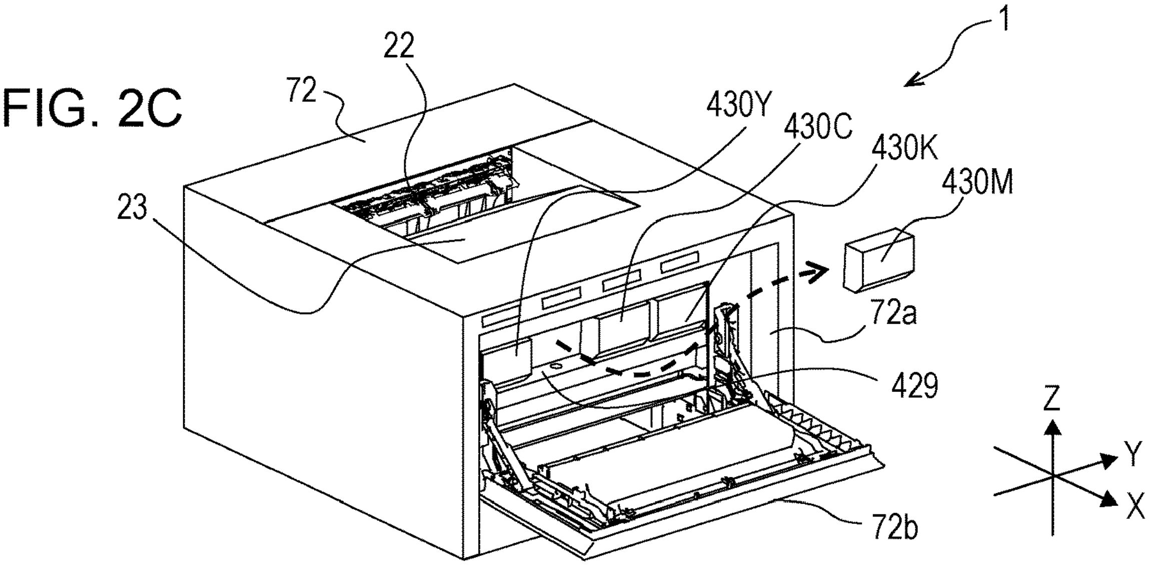
FIG. 2C is a perspective view of the image forming apparatus, with a toner cartridge removed.

Next, the schematic configuration of the toner cartridges 430Y, 430M, 430C, and 430K will be described with reference to FIGS. 2A to 2C. FIG. 2A is a perspective view of the image forming apparatus 1. FIG. 2B is a perspective view of the image forming apparatus 1, with a front door 72*b* opened. FIG. 2C is a perspective view of the image forming apparatus 1, with the toner cartridge 430M removed.

As illustrated in FIG. 2A, the image forming apparatus 1 includes the front door 72*b* which is openably and closably supported ty the casing of the apparatus body 72. The front door 72*b* covers an opening 72*a* provided at the front of the apparatus body 72, that is, the downstream end in the X-direction by being located at the closed position, as illustrated in FIGS. 2A and 2B. As illustrated in FIG. 2B, the front door 72*b* opens the opening 72*a* of the apparatus body 72 by being located at the open position. The front door 72*b* may be kept in its orientation at the open position.

As illustrated in FIG. 2B, when the front door 72*b* is opened from the closed position to the open position, the toner cartridges 430Y, 430M, 430C, and 430K are exposed outside the image forming apparatus 1 through the opening 72*a*. This allows the user to access the toner cartridges 430Y, 430M, 430C, and 430K. The toner cartridges 430Y, 430M, 430C, and 430K may replenish the respective developer containers 3Y, 3M, 3C, and 3K of the process cartridges PY, PM, PC, and PK with toner.

The toner cartridges 430Y, 430M, 430C, and 430K are disposed downstream of the apparatus body 72 in the X-direction and downstream in the Z-direction, that is, on the front side and the upside of the apparatus body 72. In other words, the toner cartridges 430Y, 430M, 430C, and 430K are disposed downstream of the apparatus body 72 in the sheet discharge direction of the discharge roller pair 22. The toner cartridges 430Y, 430M, 430C, and 430K are arranged side by side in the Y-direction. In other words, the X-direction in which the process cartridges PY, PM, PC, and PK are arranged intersects the Y-direction in which the toner cartridges 430Y, 430M, 430C, and 430K are arranged.

As illustrated in FIG. 2C, the toner cartridges 430Y, 430M, 430C, and 430K are supported by a cartridge holder 429 provided in the apparatus body 72 so as to be detachable in the X-direction. This allows the toner cartridges 430Y, 430M, 430C, and 430K to be replaced without detaching the process cartridges PY, PM, PC, and PK from the apparatus body 72. The toner cartridges 430Y, 430M, 430C, and 430K are disposed at the front side of the apparatus body 72 and are exposed by opening the front door 72*b*, which facilitates replacement.

The cartridge holder 429 is disposed at the front side of the apparatus body 72 and downstream from the process cartridges PY, PM, PC, and PK in the X-direction. For this reason, even when the toner cartridges 430Y, 430M, 430C, and 430K are detached from the cartridge holder 429, the process cartridges PY, PM, PC, and PK are covered with the cartridge holder 429 and are not exposed outside the image forming apparatus 1 through the opening 72*a*. The toner cartridges 430Y, 430M, 430C, and 430K are housed in the apparatus body 72, with the front door 72*b* located at the closed position.

As illustrated in FIG. 2A, indicators 208Y, 208M, 208C, and 208K are provided on the front surface 72*c* of the apparatus body 72. The indicators 208Y, 208M, 208C, and 208K are provided to clearly indicate the colors of the toners contained in the toner cartridges 430Y, 430M, 430C, and 430K for the user. The indicators 208Y, 208M, 208C, and 208K are LEDs, seals, etc. For example, the indicator 208Y is made of an LED that lights up or blinks in yellow or a seal colored in yellow. The indicators 208Y, 208M, 208C, and 208K may have the function to display the remaining amounts of toners contained in the process cartridges PY, PM, PC, and PK, respectively.

In this embodiment, the indicators 208Y, 208M, 208C, and 208K are provided on the front surface 72*c* of the apparatus body 72 and are not covered with the front door 72*b* located at the closed position. In other words, the indicators 208Y, 208M, 208C, and 208K are exposed outside the image forming apparatus 1 regardless of the position of the front door 72*b*. Alternatively, the indicators 208Y, 208M, 208C, and 208K may be covered with the front door 72*b* located at the closed position and may be exposed outside by opening the front door 72*b*.

Image Forming Unit

Figure 3A:
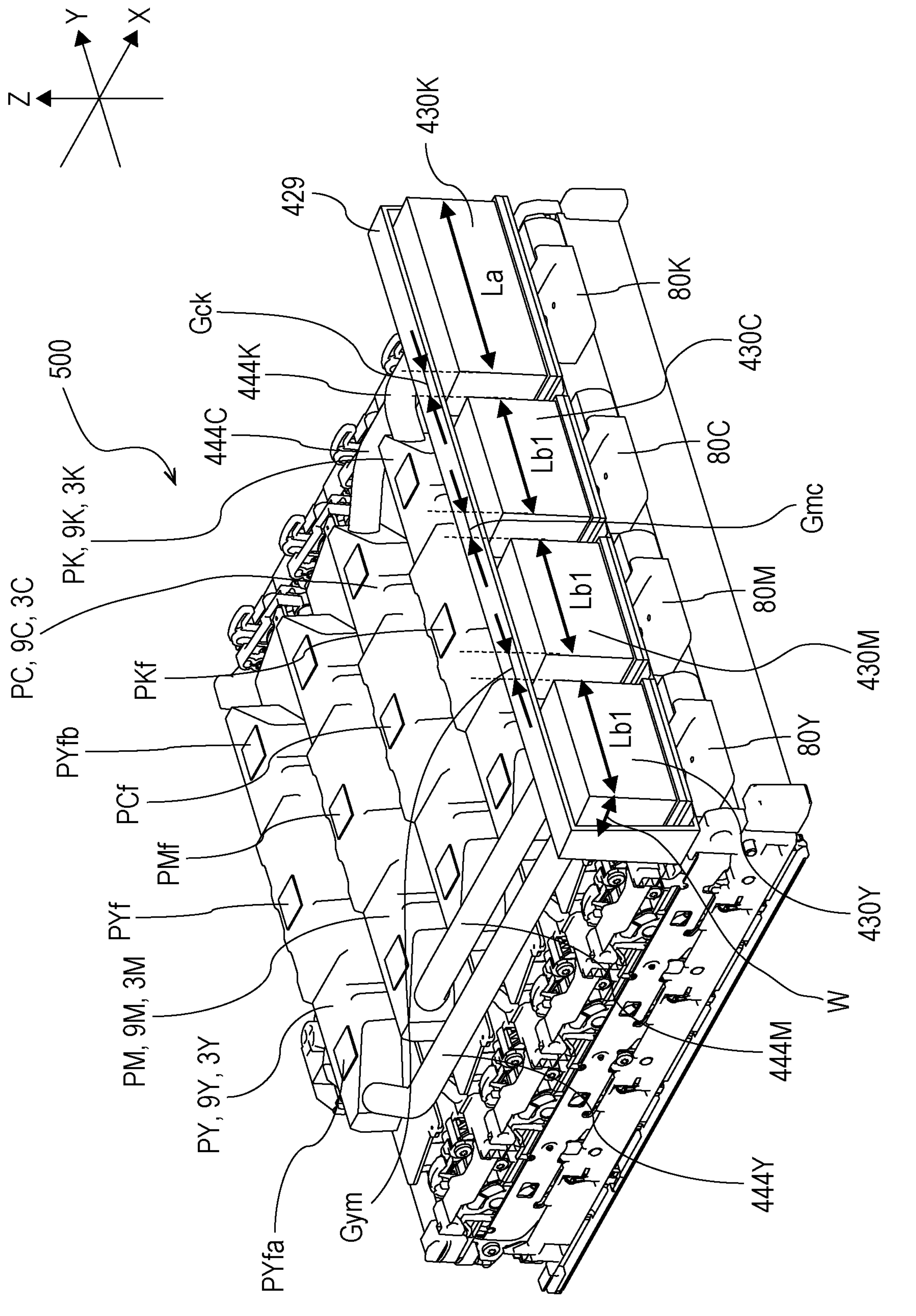
FIG. 3A is a perspective view of an image forming unit.
Figure 3B:
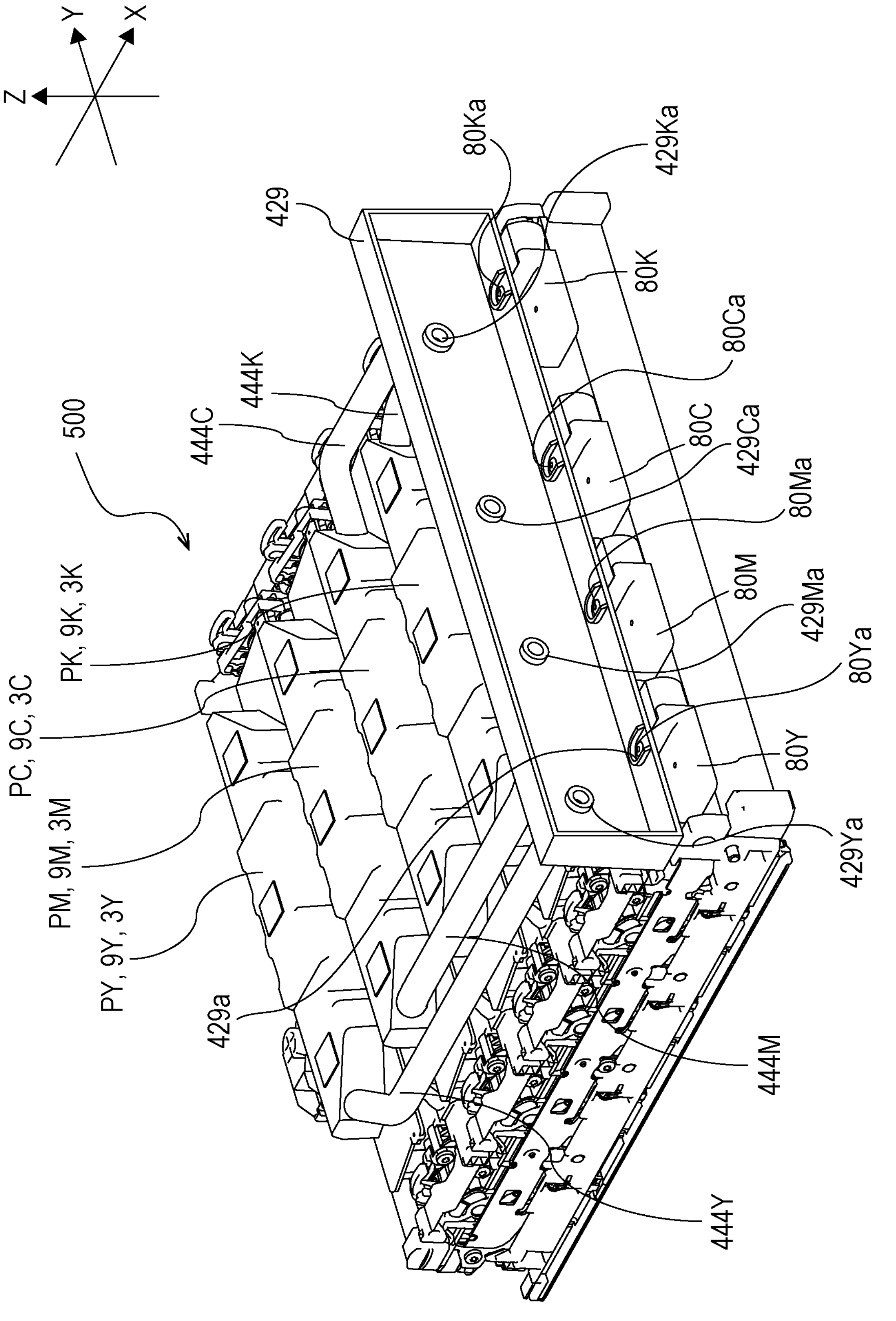
FIG. 3B is a perspective view of the image forming unit, with the toner cartridges removed.

Next, referring to FIGS. 3A to 8, an image forming unit 500 including a toner conveying mechanism for conveying toner from the toner cartridges 430Y, 430M, 430C, and 430K to the process cartridges PY, PM, PC, and PK, respectively, will be described. FIG. 3A is a perspective view of the image forming unit 500. FIG. 3B is a perspective view of the image forming unit 500, with the toner cartridges 430Y, 430M, 430C, and 430K removed.

Figure 4:
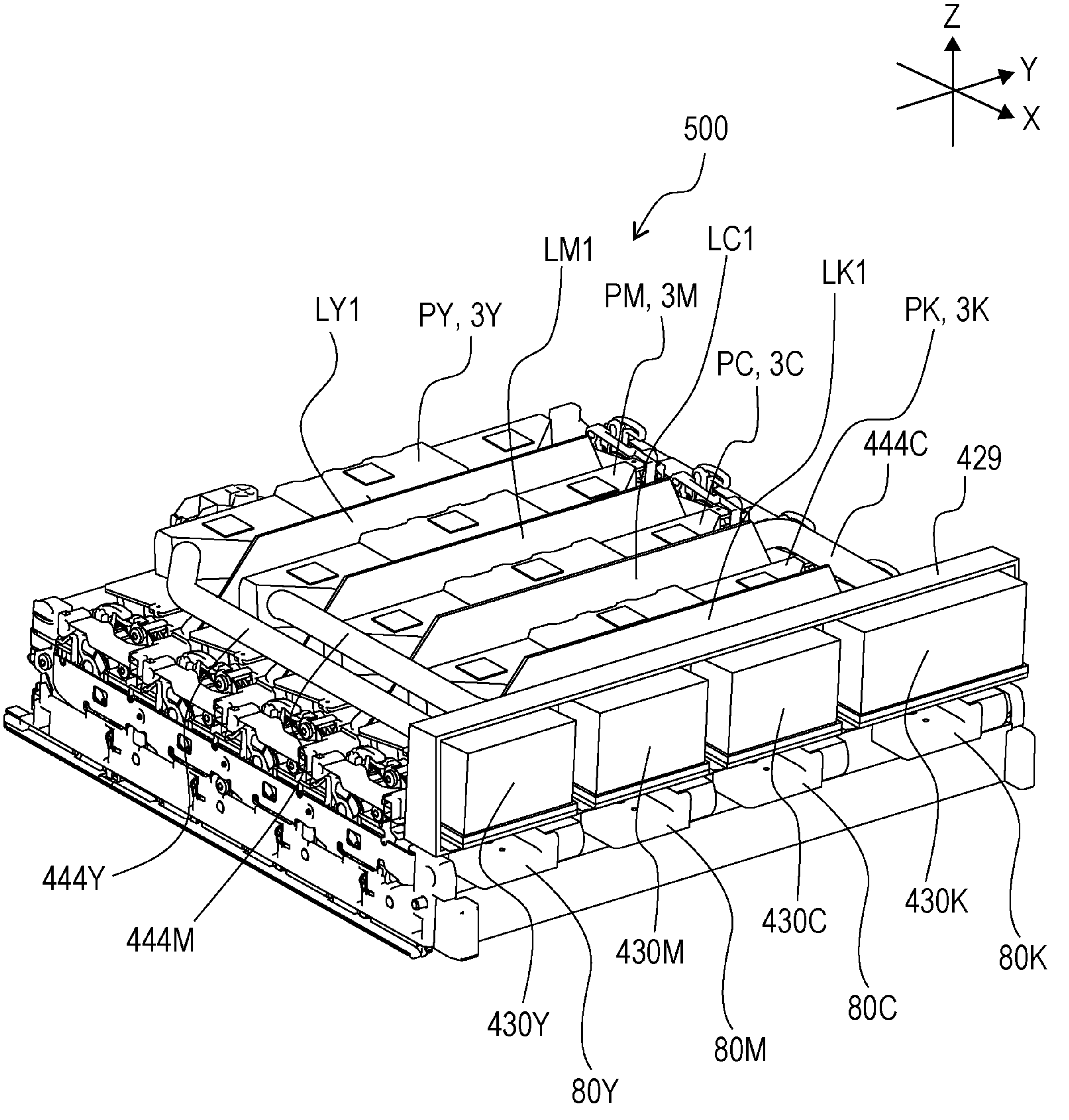
FIG. 4 is a perspective view of the image forming unit illustrating the optical paths of the laser beams emitted from a laser scanner.
Figure 5A:
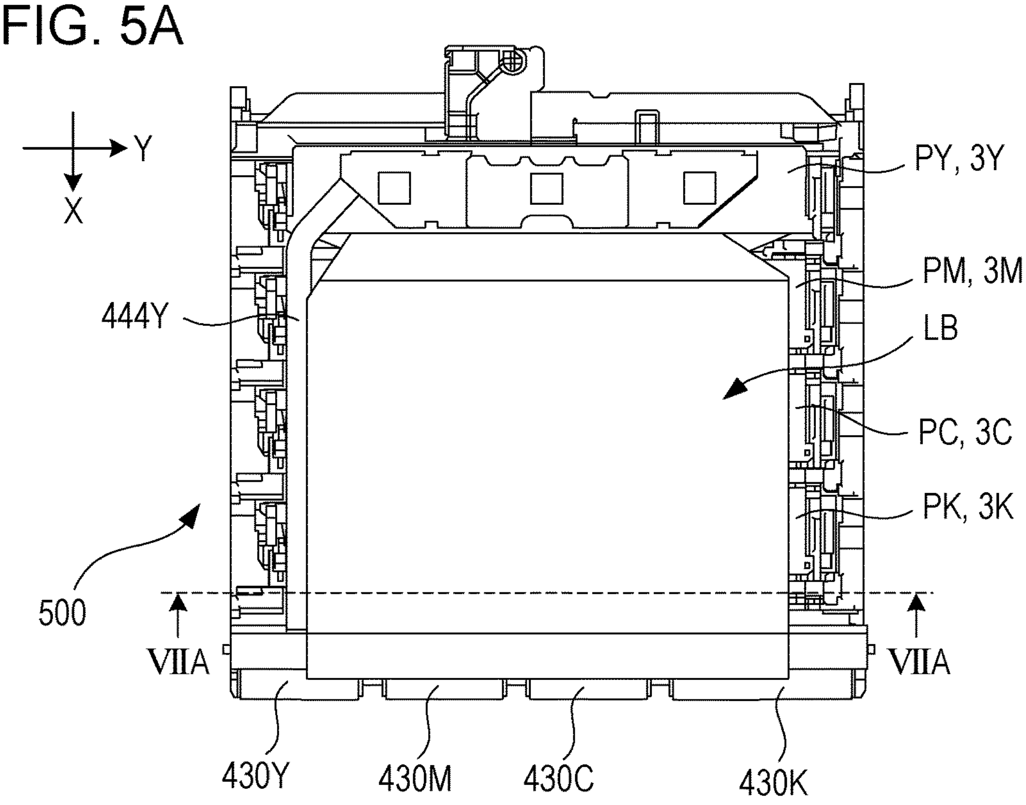
FIG. 5A is a plan view of the laser scanner and the image forming unit.
Figure 5B:
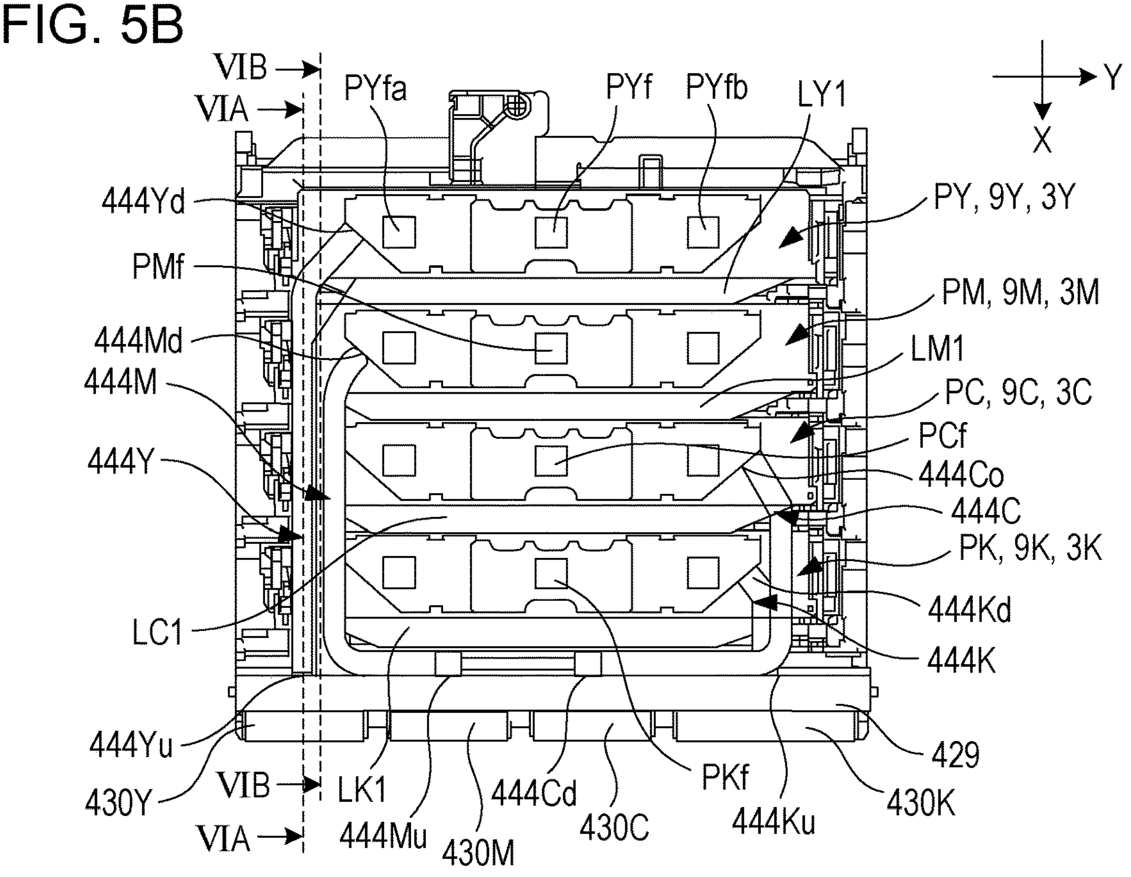
FIG. 5B is a plan view of the image forming unit.
Figure 7A:
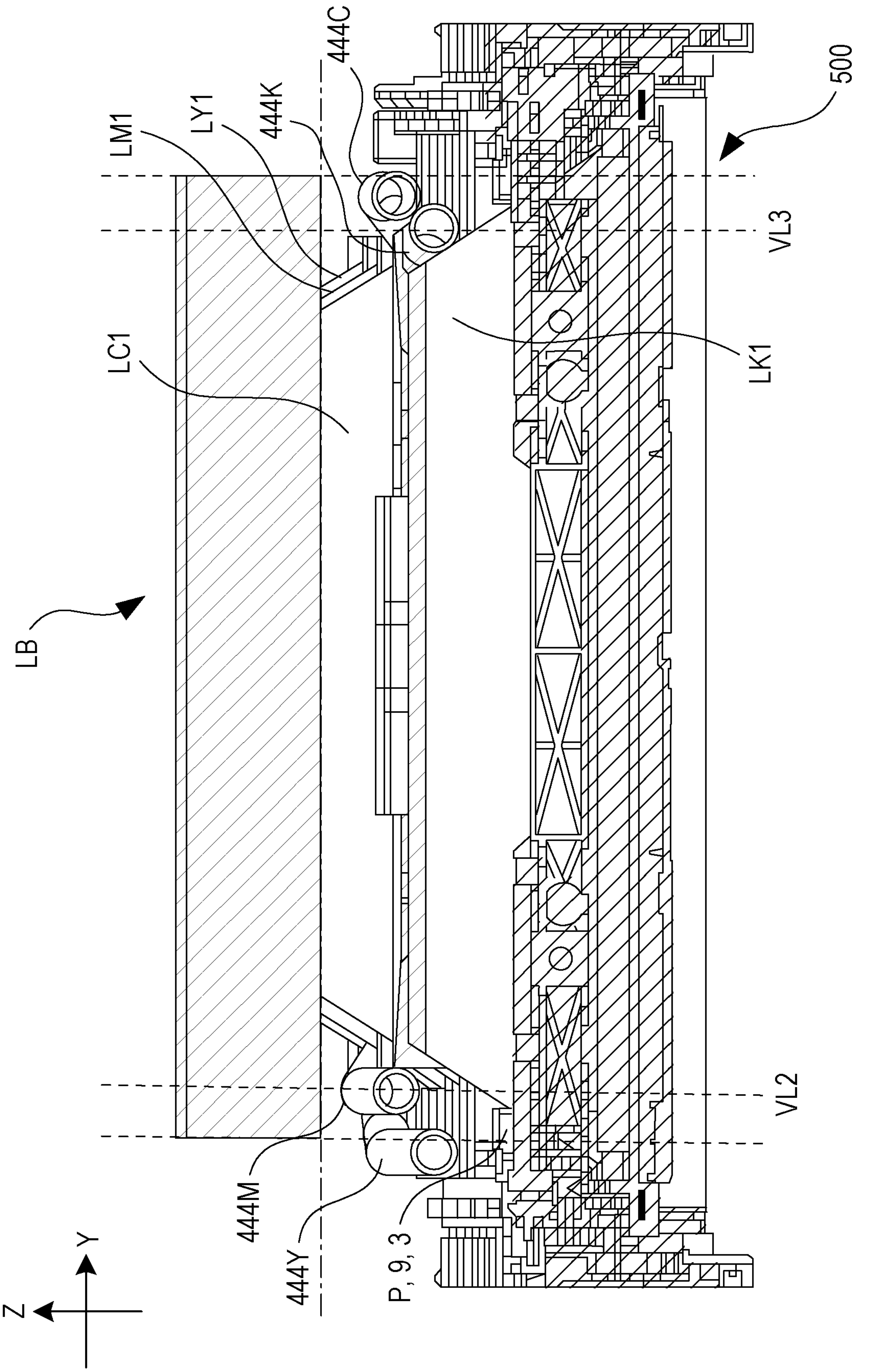
FIG. 7A is a cross-sectional view of the image forming unit in FIG. 5A taken along line VIIA-VIIA.

FIG. 4 is a perspective view of the image forming unit 500 illustrating the respective optical paths LY1, LM1, LC1, and LK1 of the laser beams LY, LM, LC, and LK emitted from the laser scanner LB. FIGS. 4, 5B, and 7A illustrate the optical paths LY1, LM1, LC1, and LK1 in a visualized manner for convenience. FIG. 5A is a plan view of the laser scanner LB and the image forming unit 500. FIG. 5B is a plan view of the image forming unit 500.

Figure 6A:
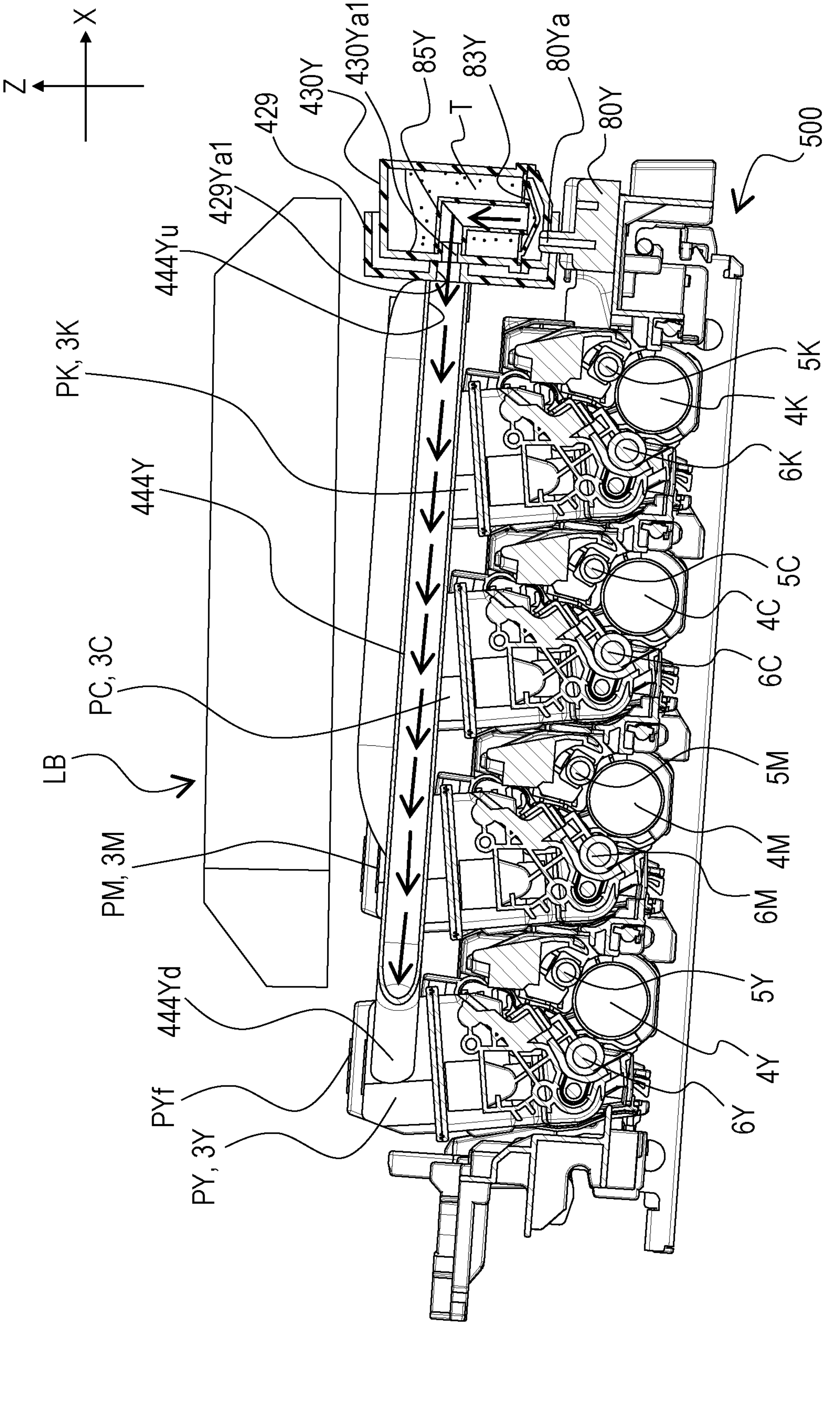
FIG. 6A is a cross-sectional view of the image forming unit in FIG. 5B taken along line VIA-VIA.
Figure 6B:
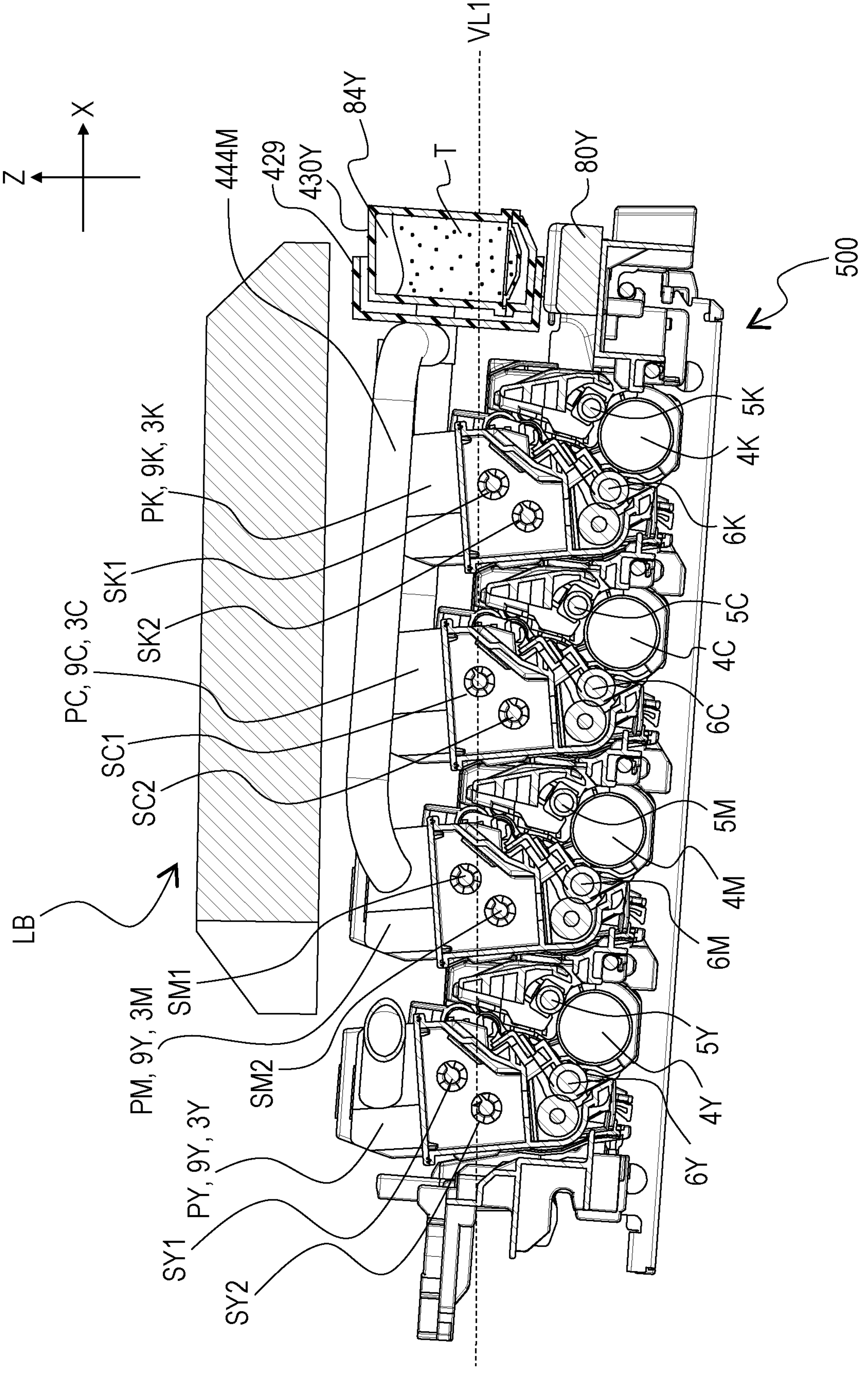
FIG. 6B is a cross-sectional view of the image forming unit in FIG. 5B taken along line VIB-VIB.
Figure 7B:
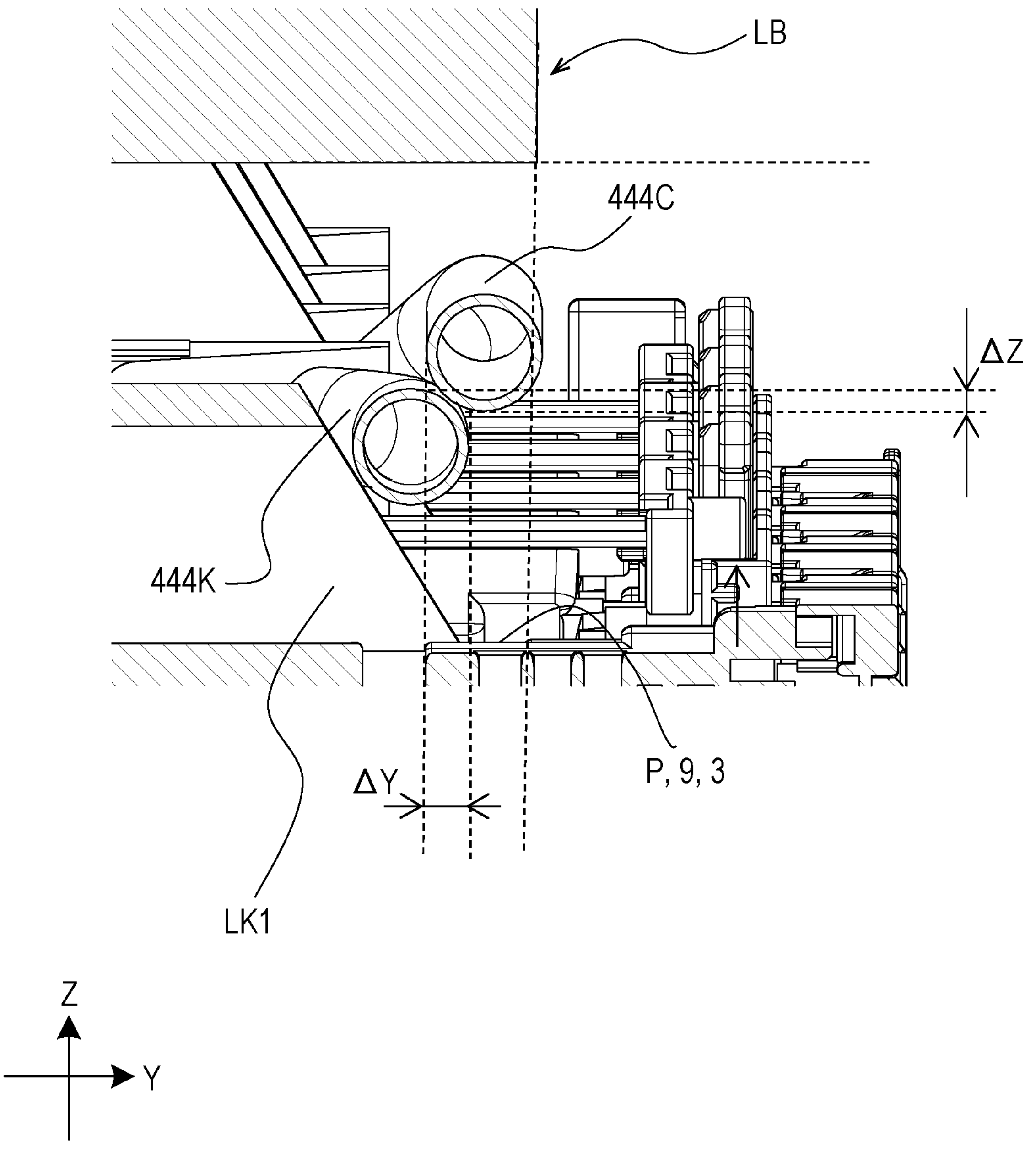
FIG. 7B is an enlarged cross-sectional view of supply pipes.
Figure 8:
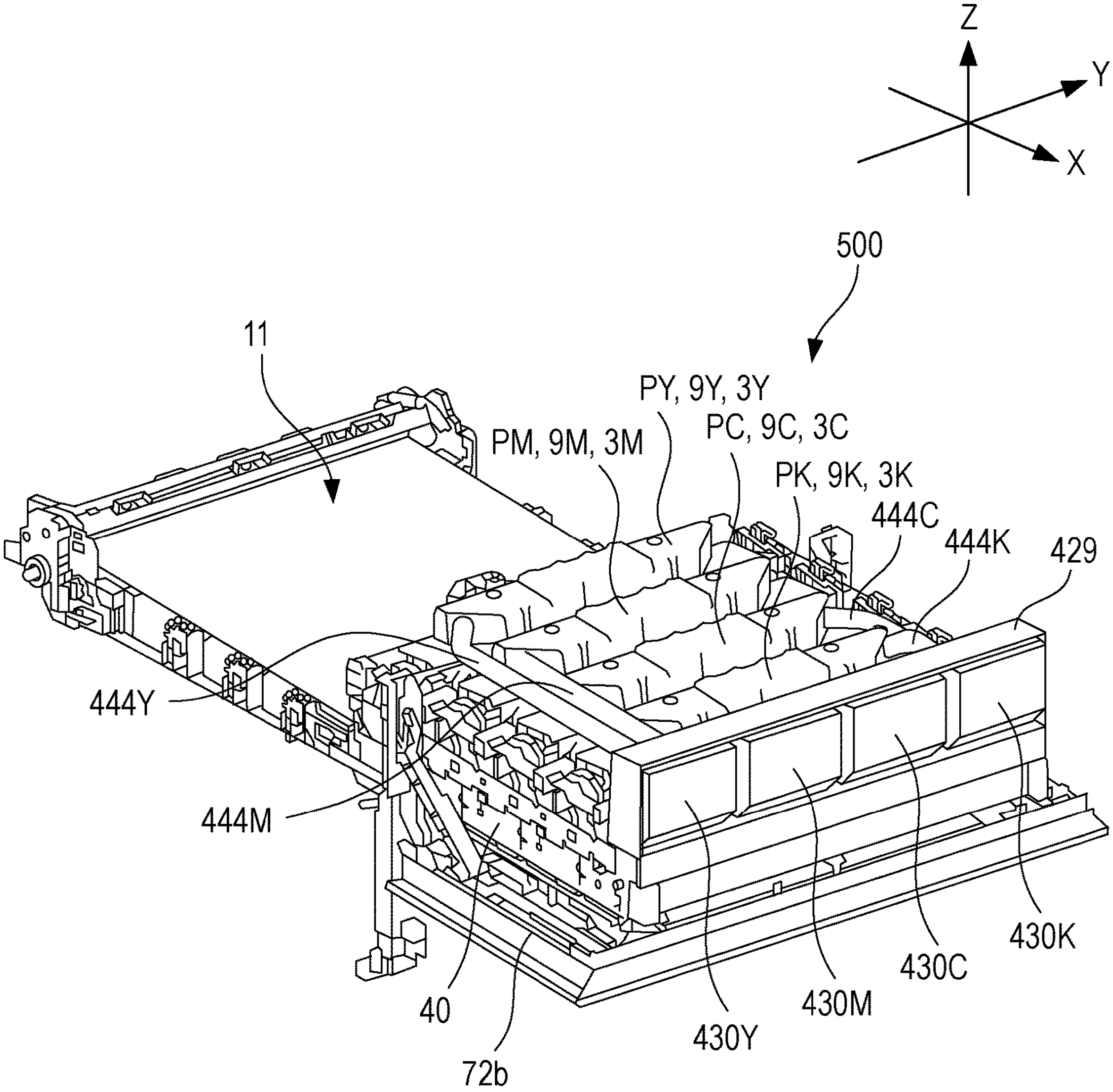
FIG. 8 is a perspective view of the image forming unit drawn out from the apparatus body.

FIG. 6A is a cross-sectional view of the image forming unit 500 in FIG. 5B taken along line VIA-VIA. FIG. 6B is a cross-sectional view of the image forming unit 500 in FIG. 5B taken along line VIB-VIB. FIG. 7A is a cross-sectional view of the image forming unit 500 in FIG. 5A taken along line VIIA-VIIA. FIG. 7B is an enlarged cross-sectional view of supply pipes 444C and 444K. FIG. 8 is a perspective view of the image forming unit 500 drawn out from the apparatus body 72.

As illustrated in FIGS. 3A, 3B, and 4, the image forming unit 500 includes the process cartridges PY, PM, PC, and PK, the toner cartridges 430Y, 430M, 430C, and 430K, the cartridge holder 429, and pump units 80Y, 80M, 80C, and 80K. The pump units 80Y, 80M, 80C, and 80K are arranged side by side in the Y-direction below the cartridge holder 429. The pump units 80Y, 80M, 80C, and 80K are positive-displacement pumps such as reciprocating pumps or rotary pumps but are not limited to the ones described above. For example, the pump units 80Y, 80M, 80C, and 80K may be non-positive-displacement pumps, such as centrifugal pumps, propeller pumps, or viscosity pumps.

The reciprocating pumps are pumps that perform suction and discharge by means of the reciprocating motion of a piston or plunger. Examples include a piston pump, a plunger pump, and a diaphragm pump. The rotary pump is a pump that performs suction and discharge by rotating gears or rotors. Examples include a gear pump, a screw pump, and a vane pump. The four pump units 80Y, 80M, 80C, and 80K may be integrated into a single pump unit or two or three pump units. In this embodiment, the pump units 80Y, 80M, 80C, and 80K are provided in the apparatus body 72 but may also be provided for the toner cartridges 430Y, 430M, 430C, and 430K, respectively.

As illustrated in FIG. 3B, the pump units 80Y, 80M, 80C, and 80K include ejection ports 80Ya, 80Ma, 80Ca, and 80Ka that eject air, respectively. These ejection ports 80Ya, 80Ma, 80Ca, and 80Ka are open upward, that is, in the Z-direction.

The cartridge holder 429 includes openings that individually face the ejection ports 80Ya, 80Ma, 80Ca, and 80Ka and intake ports 429Ya, 429Ma, 429Ca, and 429Ka. The openings are provided on the lower surface of the cartridge holder 429. The intake ports 429Ya, 429Ma, 429Ca, and 429Ka are through-holes provided on the back of the cartridge holder 429. The intake ports 429Ya, 429Ma, 429Ca, and 429Ka are open in the X-direction and therefore intersect the Z-direction, which is the opening direction of the ejection ports 80Ya, 80Ma, 80Ca, and 80Ka.

In a state in which the toner cartridges 430Y, 430M, 430C, and 430K are attached to the cartridge holder 429, the air ejected from the ejection ports 80Ya, 80Ma, 80Ca, and 80Ka is supplied into the toner cartridges 430Y, 430M, 430C, and 430K. The toner discharged from the toner cartridges 430Y, 430M, 430C, and 430K together with the air is received by supply pipes 444Y, 444M, 444C, and 444K through the intake ports 429Ya, 429Ma, 429Ca, and 429Ka of the cartridge holder 429, respectively.

The supply pipes 444Y, 444M, 444C, and 444K respectively include upstream ends 444Yu, 444Mu, 444Cu, and 444Ku connected to the intake ports 429Ya, 429Ma, 429Ca, and 429Ka and downstream ends 444Yd, 444Md, 444Cd, and 444Kd connected to the developer containers 3Y, 3M, 3C, and 3K.

The toner discharged from the toner cartridges 430Y, 430M, 430C, and 430K together with the air is supplied to the developer containers 3Y, 3M, 3C, and 3K through the supply pipes 444Y, 444M, 444C, and 444K, respectively.

The respective downstream ends 444Yd and 444Md of the supply pipes 444Y and 444M are connected to the upstream ends in the Y-direction, or the left ends, of the developer containers 3Y and 3M. The respective downstream ends 444Cd and 444Kd of the supply pipes 444C and 444K are connected to the downstream ends in the Y-direction, or the right ends, of the developer containers 3C and 3K. By separately arranging the supply pipes 444Y, 444M, 444C, and 444K on the left and right of the developer containers 3Y, 3M, 3C, and 3K in this manner, the supply pipes 444Y, 444M, 444C, and 444K can be made short. This allows for reducing the pressure loss in the supply pipes 444Y, 444M, 444C, and 444K and reducing the size of the image forming unit 500.

Next, the placement of the toner cartridge 430Y will be described. As illustrated in FIG. 6B, the toner cartridge 430Y and the process cartridges PY, PM, PC, and PK are arranged along a phantom line VL1 extending in the X-direction. In other words, as illustrated in FIGS. 1 and 6B, the toner cartridges 430Y, 430M, 430C, and 430K are arranged alongside the process cartridges PY, PM, PC, and PK in the X-direction. In other words, as viewed in the X-direction, at least part of each of the toner cartridges 430Y, 430M, 430C, and 430K overlaps with the process cartridges PY, PM, PC, and PK in the Z-direction. This allows for reducing the size of the image forming unit 500 in the Z-direction, or the vertical direction, miniaturizing the image forming apparatus 1.

Although in this embodiment the toner cartridges 430Y, 430M, 430C, and 430K are arranged as described above, this arrangement is illustrative only. In other words, the toner cartridges 430Y, 430M, 430C, and 430K may be disposed above the process cartridges PY, PM, PC, and PK in the Z-direction.

Next, the arrangement of the supply pipes 444Y, 444M, 444C, and 444K will be described.

As illustrated in FIGS. 4 and 5B, the supply pipes 444Y, 444M, 444C, and 444K are dispose not to interfere with the optical paths LY1, LM1, LC1, and LK1.

The supply pipes 444Y, 444M, 444C, and 444K are separately arranged on the right and left of the process cartridges PY, PM, PC, and PK. The supply pipes 444Y, 444M, 444C, and 444K are disposed below the laser scanner LB.

As illustrated in FIG. 5A, at least part of the supply pipe 444Y does not overlap with the laser scanner LB in plan view. The entire supply pipe 444M overlaps with the laser scanner LB in plan view. The supply pipe 444Y is disposed on the left, or upstream in the Y-direction, of the laser scanner LB. As illustrated in FIG. 7A, the supply pipes 444Y and 444M are disposed below the laser scanner LB and above the process cartridges PY, PM, PC, and PK. In other words, the supply pipes 444Y and 444M are disposed in the space between the laser scanner LB and the process cartridges PY, PM, PC, and PK in the Z-direction.

The optical paths LY1, LM1, LC1, and LK1 widen in the lateral direction, or Y-direction, as they move downwards. As illustrated in FIGS. 5B, 6B, and 7A, the supply pipe 444M is disposed in the space between the laser scanner LB and the optical paths LM1, LC1, and LK1 in the Z-direction. In other words, as illustrated in FIG. 7A, the supply pipe 444M and the optical path LK1 are disposed so as to be aligned with a phantom line VL2 extending in the Z-direction, as viewed in the X-direction.

As illustrated in FIG. 5A, the whole of the supply pipes 444C and 444K completely overlap with the laser scanner LB in plan view. The supply pipe 444C is disposed on the right of the supply pipe 444K, that is, downstream in the Y-direction. As illustrated in FIG. 7A, the supply pipes 444C and 444K are disposed below the laser scanner LB and above the process cartridges PY, PM, PC, and PK. In other words, the supply pipes 444C and 444K are disposed in the space between the laser scanner LB and the process cartridges PY, PM, PC, and PK in the Z-direction.

As illustrated in FIGS. 5B and 7A, the supply pipe 444K is disposed in the space between the laser scanner LB and the optical path LK1 in the Z-direction. In other words, as illustrated in FIG. 7A, the supply pipe 444K and the optical path LK1 are disposed so as to be aligned with a phantom line VL3 extending in the Z-direction, as viewed in the X-direction.

As illustrated in FIG. 7B, the supply pipe 444C is disposed above the supply pipe 444K. The supply pipe 444C overlaps with the supply pipe 444K by a distance ΔY in the Y-direction, as viewed in the X-direction. The supply pipe 444C overlaps with the supply pipe 444K by a distance ΔZ in the Z-direction, as viewed in the X-direction.

As has been described above, the supply pipes 444Y, 444M, 444C, and 444K are compactly arranged so as not to interfere with the optical paths LY1, LM1, LC1, and LK1. Thus, the image forming unit 500 and the image forming apparatus 1 can be miniaturized. The image forming unit 500 can be reduced in size particularly in the Y-direction and the Z-direction. The supply pipes 444Y, 444M, 444C, and 444K do not have to be arranged as described above.

The image forming unit 500 may be configured so that the process cartridges PY, PM, PC, and PK and the supply pipes 444Y, 444M, 444C, and 444K are accessible for maintenance or replacement. For this purpose, as illustrated in FIG. 8, the image forming unit 500 of this embodiment is configured to be drawn in the X-direction from the apparatus body 72 including the intermediate transfer belt unit 11. This configuration may improve the maintainability of the image forming unit 500. The image forming unit 500 may be configured not to be drawn in the X-direction from the apparatus body 72.

Schematic Configuration of Toner Cartridge

Figure 9A:
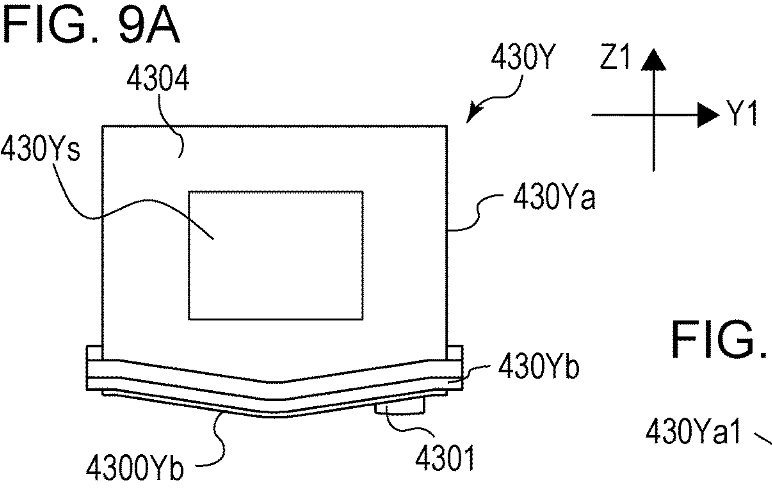
FIG. 9A is a front view of a toner cartridge.
Figure 9B:
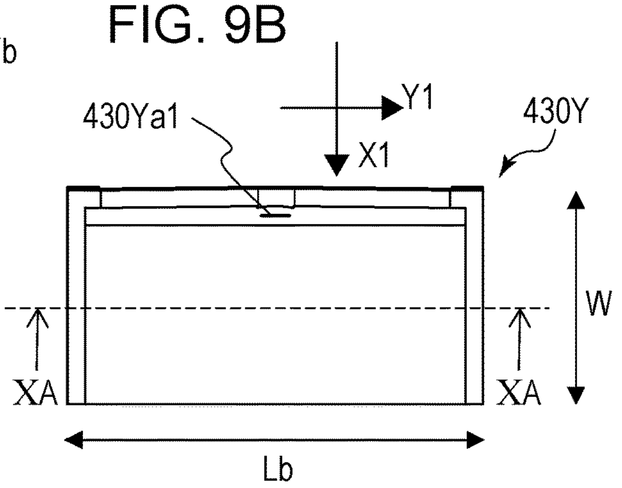
FIG. 9B is a plan view of the toner cartridge.
Figure 9C:
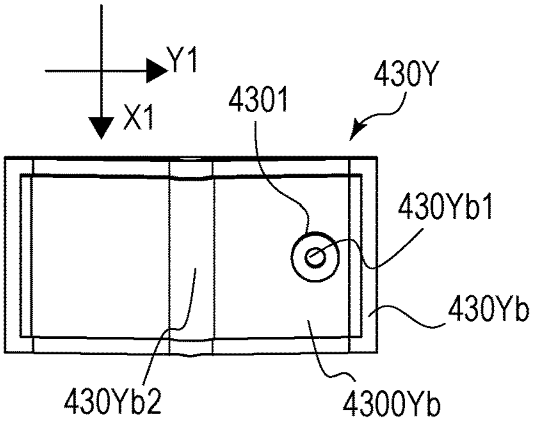
FIG. 9C is a bottom view of the toner cartridge.
Figure 9D:
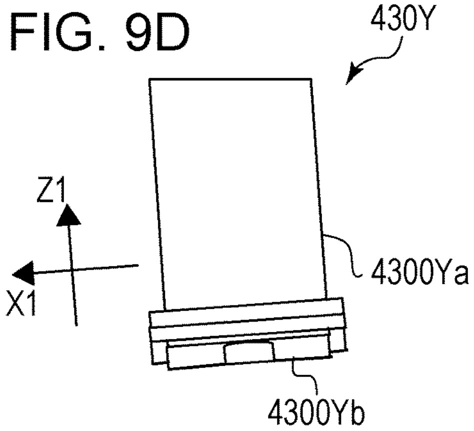
FIG. 9D is a side view of the toner cartridge.
Figure 9E:
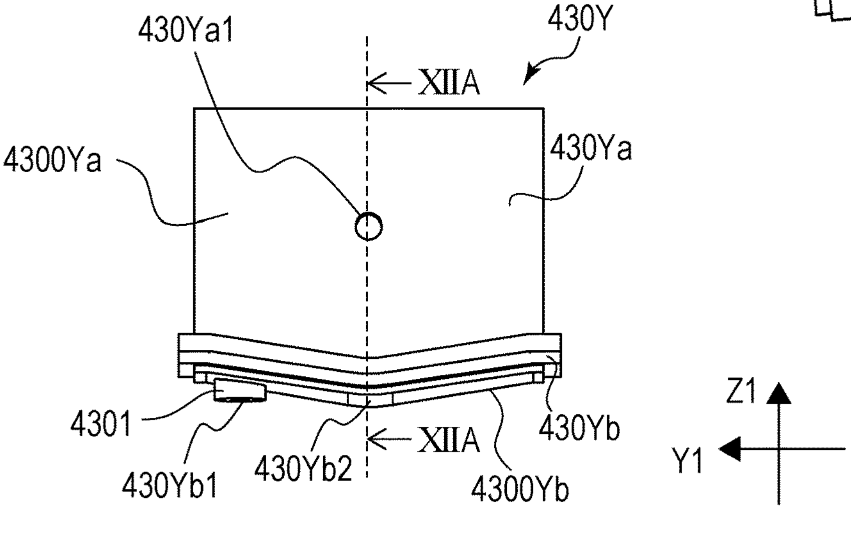
FIG. 9E is a back view of the toner cartridge.
Figure 10A:
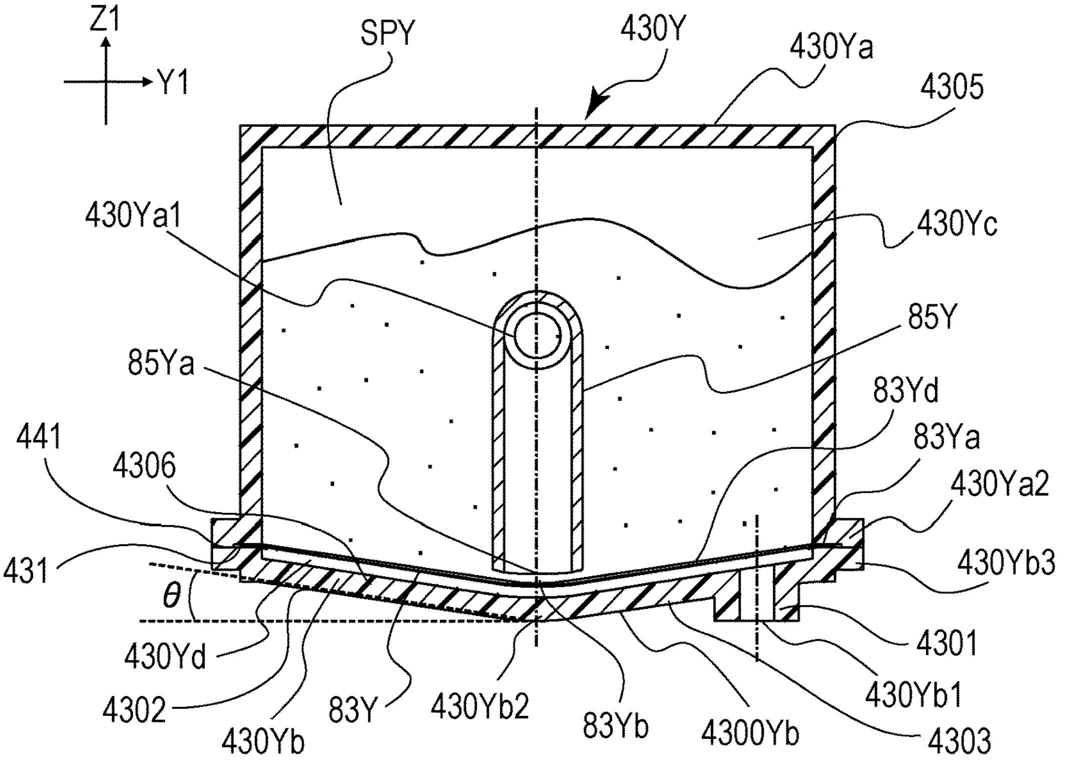
FIG. 10A is a cross-sectional view of the toner cartridge in FIG. 9B taken along line XA-XA.
Figure 10B:
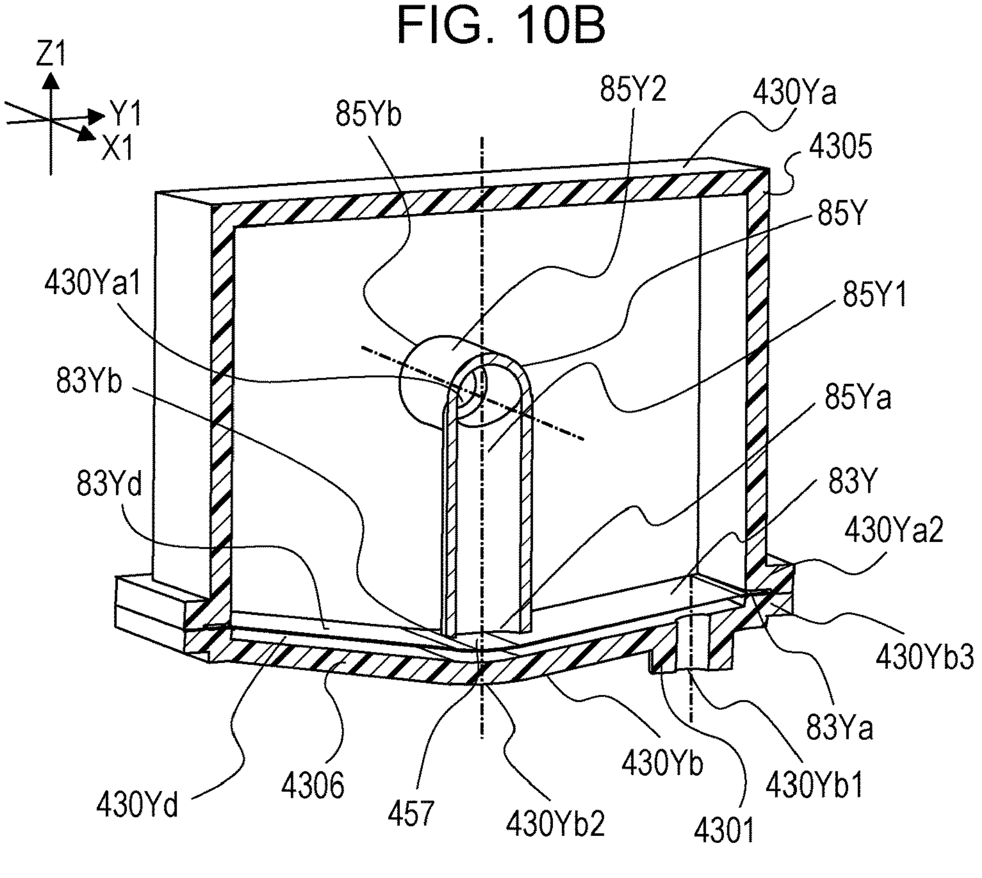
FIG. 10B is a perspective view of the toner cartridge taken on a Y1-Z1 plane.
Figure 10C:
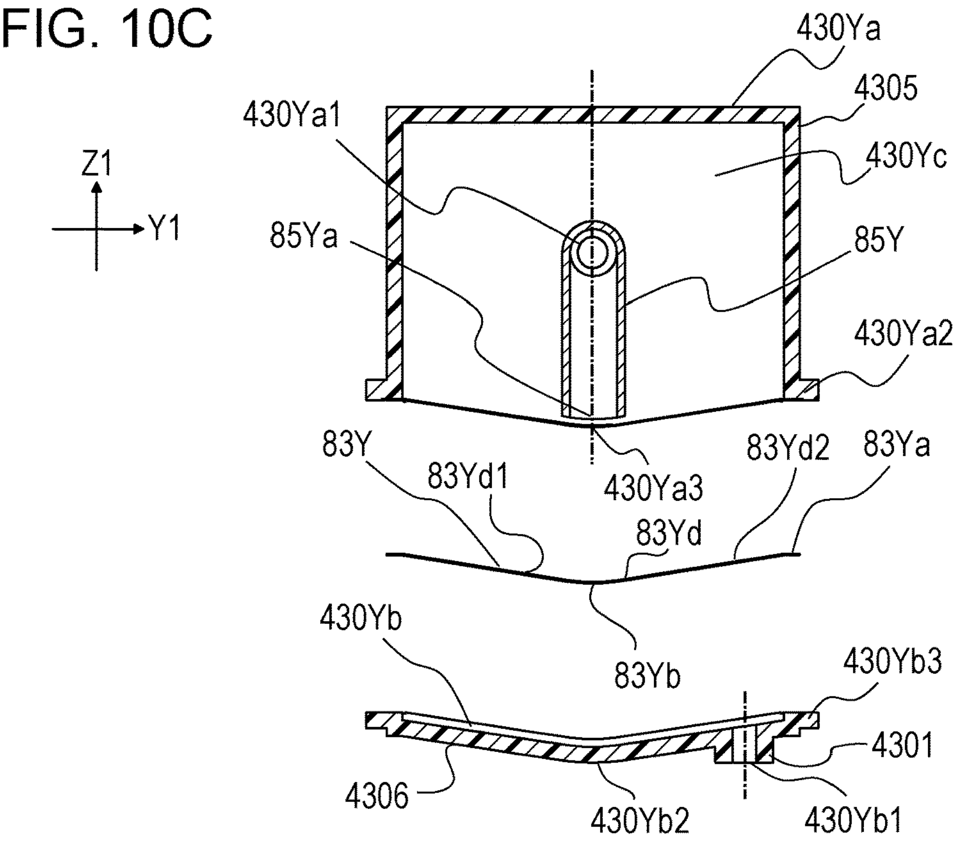
FIG. 10C is an exploded view of the toner cartridge.
Figure 10D:
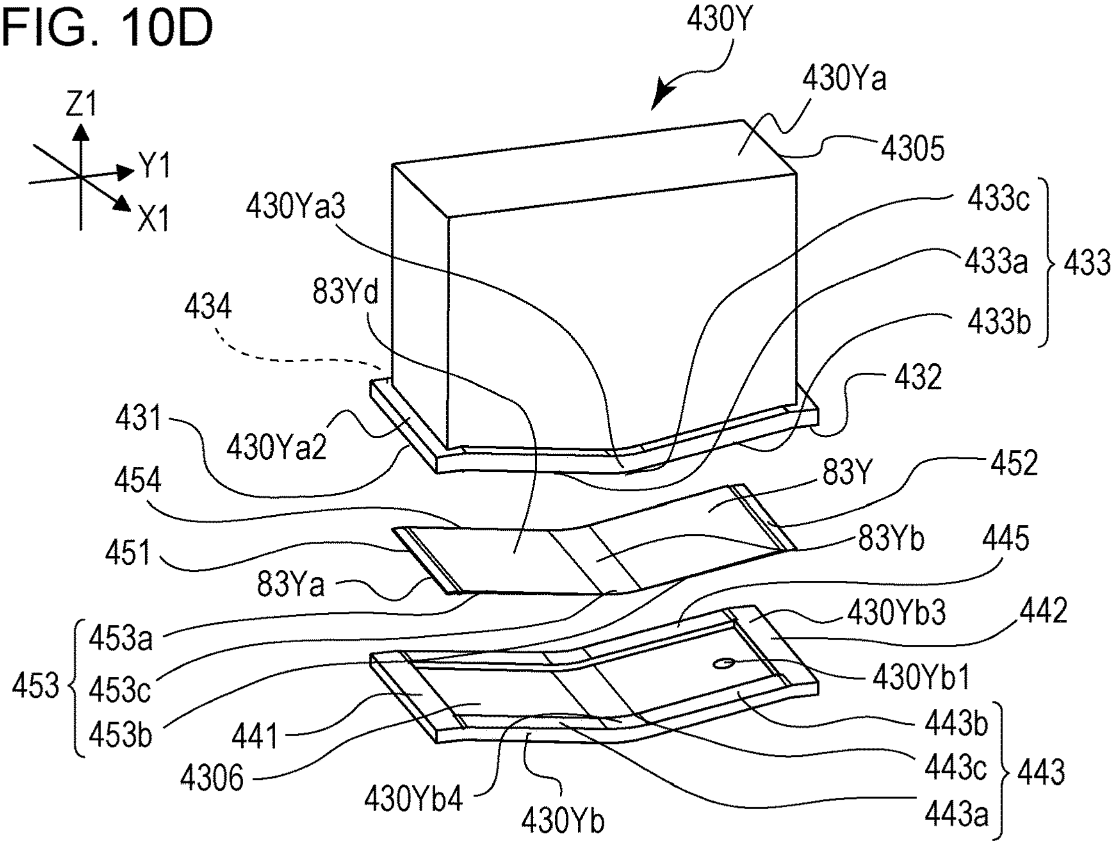
FIG. 10D is an exploded perspective view of the toner cartridge.
Figure 11:
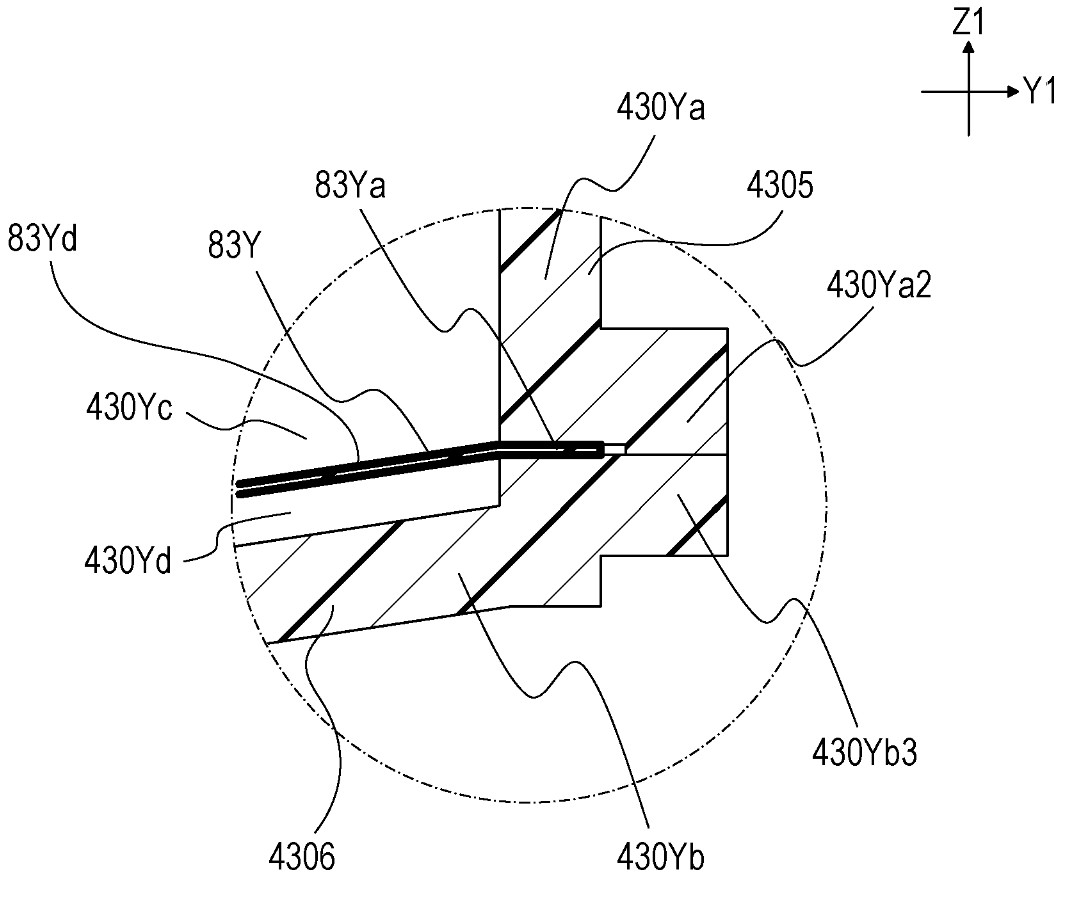
FIG. 11 is an enlarged view of the joint portion between a first frame and a second frame.
Figure 12A:
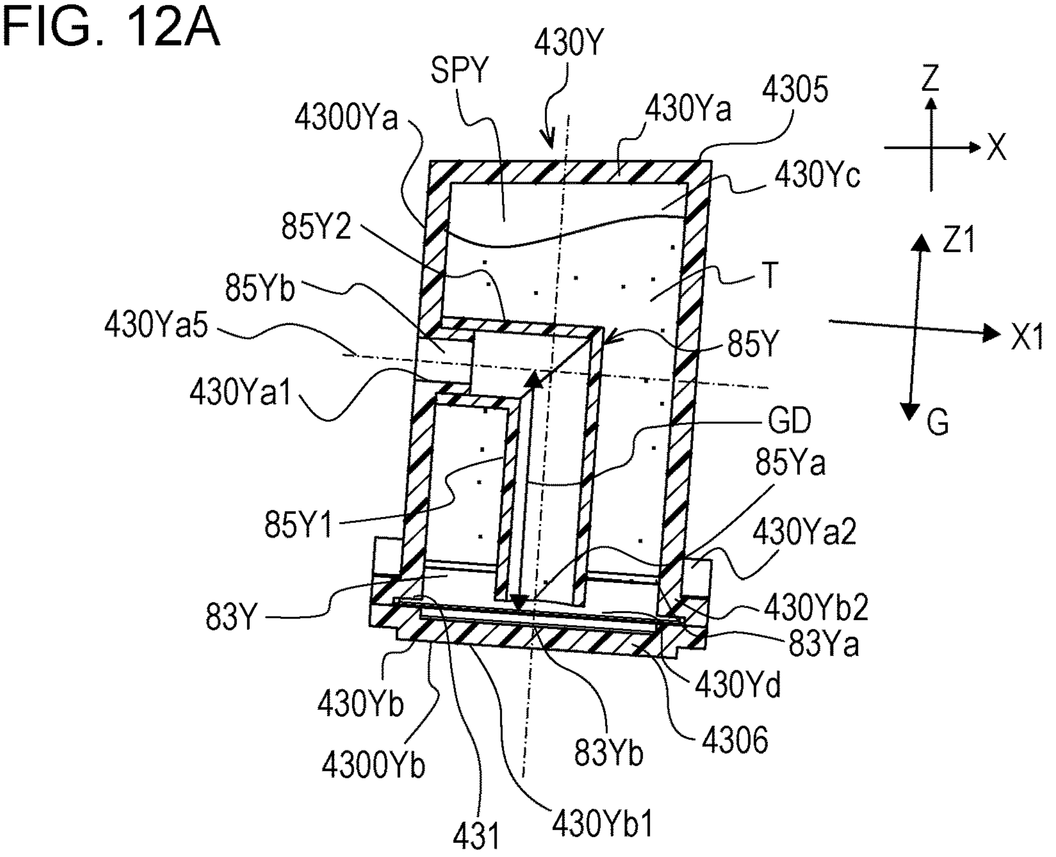
FIG. 12A is a cross-sectional view of an exhaust pipe in FIG. 9E taken along line XIIA-XIIA.
Figure 12B:
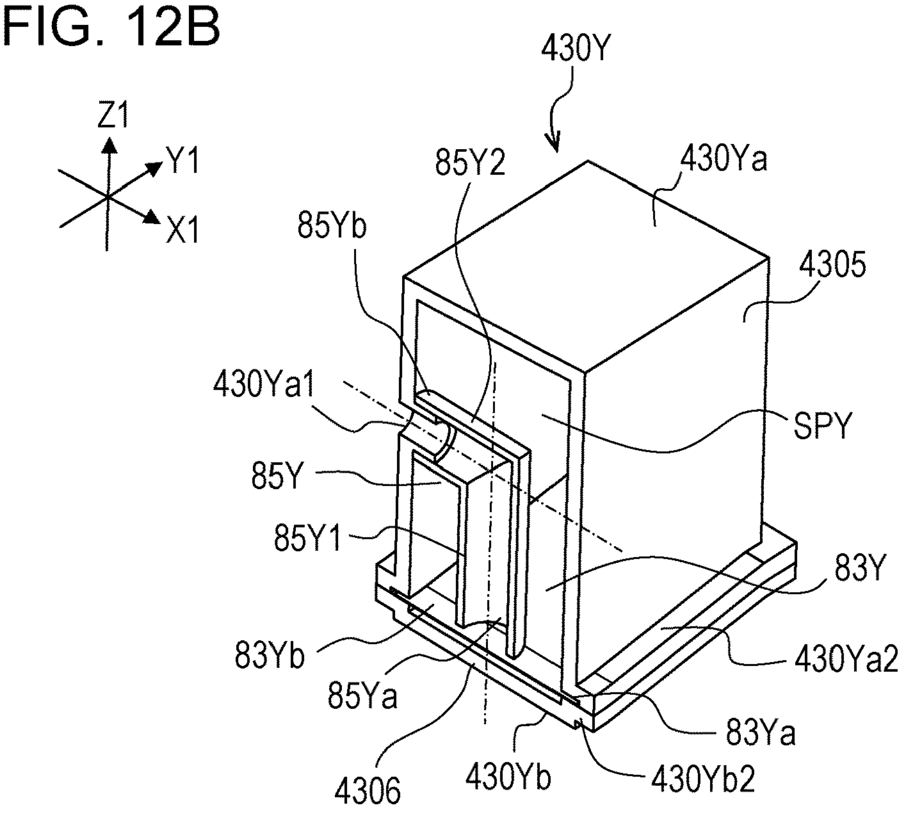
FIG. 12B is a perspective view of the exhaust pipe taken on an X1-Z1 plane.

Referring to FIGS. 9A to 12B, the schematic configuration of the toner cartridge 430Y (a cartridge) will be described. FIG. 9A is a front view of the toner cartridge 430Y. FIG. 9B is a plan view of the toner cartridge 430Y. FIG. 9C is a bottom view of the toner cartridge 430Y. FIG. 9D is a side view of the toner cartridge 430Y. FIG. 9E is a back view of the toner cartridge 430Y. FIG. 10A is a cross-sectional view of the toner cartridge 430Y in FIG. 9B taken along line XA-XA. FIG. 10B is a perspective view of the toner cartridge 430Y taken on a Y1-Z1 plane. FIG. 10C is an exploded view of the toner cartridge 430Y. FIG. 10D is an exploded perspective view of the toner cartridge 430Y. FIG. 11 is an enlarged view of the joint portion between a first frame 430Ya and a second frame 430Yb. FIG. 12A is a cross-sectional view of an exhaust pipe 85Y of the toner cartridge 430Y in FIG. 9E taken along line X11A-XIIA. FIG. 12B is a perspective view of the exhaust pipe 85Y taken on an X1-Z1 plane.

As illustrated in FIG. 3A, the toner cartridge 430K has a width La in the Y-direction. The width La is larger than the widths Lb1 of the toner cartridges 430Y, 430M, and 430C. Accordingly, the capacity of the toner cartridge 430K for toner is larger than the capacities of the toner cartridges 430Y, 430M, and 430C. In general, a black toner is consumed more than the toners of other colors. The toner cartridge 430K can house more toner than the other toner cartridges 430Y, 430M, and 430C, as described above. This configuration allows for equalizing the replacement frequency of the toner cartridges 430Y, 430M, 430C, and 430K, thereby improving the usability.

In this embodiment, the lengths W of the toner cartridges 430Y, 430M, 430C, and 430K in the X-direction are equal. The lengths W in the X-direction are smaller than the widths La and Lb1 in the Y-direction.

Since the toner cartridges 430Y, 430M, 430C, and 430K have the same configuration except the widths in the Y-direction, only the toner cartridge 430Y will be described below, and descriptions of the toner cartridges 430M, 430C, and 430K will be omitted.

In the following description, the directions (X1, Y1, Z1) are defined as illustrated in FIGS. 9A to 16C on the assumption that the toner cartridge 430Y takes the following orientation unless otherwise specified. In other words, in the direction of gravity G (opposite to the Z1-direction, see FIG. 10A), the toner cartridge 430Y takes an orientation in which a toner container 430Yc, a filter 83Y, and an air chamber 430Yd are arranged in this order from above, and in which the lateral direction (X1-direction) and the longitudinal direction (Y1-direction) of the toner cartridge 430Y are parallel to the horizontal direction perpendicular to the direction of gravity G. In this orientation, the direction opposite to the Z1-direction is the direction of gravity G, and the toner cartridge 430Y is oriented in a predetermined direction in which the toner container 430Yc is located above the air chamber 430Yd. In this case, the lateral direction of the toner cartridge 430Y is defined as the X1-direction, the longitudinal direction is defined as the Y1-direction, and the direction opposite to the direction of gravity G is defined as the Z1-direction. In other words, the direction of gravity G (a first direction) is the direction in which the second frame 430Yb and the first frame 430Y (described below) are aligned. The Y1-direction (a second direction) is the longitudinal direction of the first frame 430Ya intersecting the Z1-direction in a cross section perpendicular to the Z1-direction. The X1-direction (a third direction) is the lateral direction of the first frame 430Ya intersecting both of the Z1-direction and the Y1-direction.

The front-back direction of the toner cartridge 430Y is indicated by the X1-axis, and the direction from the back to the front surface is defined as the X1-direction. The X1-direction is sometimes referred to as the forward direction or the front side direction. The downstream side of the toner cartridge 430Y in the X1-direction is sometimes referred to as the front side, and the upstream side is sometimes referred to as the back side The lateral direction of the toner cartridge 430Y is indicated by the Y1-axis, and the direction from the left to the right of the toner cartridge 430Y is defined as the Y1-direction. The Y1-direction is sometimes referred to as the rightward direction. The downstream side of the toner cartridge 430Y in the Y1-direction is sometimes referred to as the right side, and the upstream side is sometimes referred to as the left side.

The vertical direction of the toner cartridge 430Y is indicated by the Z1-axis, and the direction from below to above the toner cartridge 430Y is defined as the Z1-direction. The Z1-direction is sometimes referred to as the upward direction, the height direction, or the vertical direction. The downstream side of the toner cartridge 430Y in the Z1-direction is sometimes referred to as the upside, the upper surface side, or the top side, and the upstream side is sometimes referred to as the downside, the lower surface side, or the bottom side.

The X1-axis, the Y1-axis, and the Z1-axis are perpendicular to one another. For example, the X1-axis is perpendicular to the Y1-axis and also to the Z1-axis. A plane perpendicular to the X1-axis is sometimes referred to as the Y1-Z1 plane. A plane perpendicular to the Y1-axis is sometimes referred to as the Z1-X1 plane. A plane perpendicular to the Z1-axis is sometimes referred to as the X1-Y1 plane.

As illustrated in FIGS. 9A to 10D, the toner cartridge 430Y includes the first frame 430Ya (a second container), the second frame 430Yb (a first container), the filter 83Y, and the exhaust pipe 85Y. Although in this embodiment the first frame 430Ya and the second frame 430Yb are made of resin, they may also be made of paper or other materials. The filter 83Y is fixed between the first frame 430Ya and the second frame 430Yb (described in detail below).

The internal space SPY of the toner cartridge 430Y is partitioned by the filter 83Y into the toner container 430Yc and the air chamber 430Yd. In other words, the toner container 430Yc is formed by the first frame 430Ya and the filter 83Y, and the air chamber 430Yd is formed by the second frame 430Yb and the filter 83Y. The air chamber 430Yd (a first chamber) is disposed below the filter 83Y. The toner container 430Yc is disposed above the filter 83Y.

The toner container 430Yc (a second chamber) is configured to contain toner T (see FIG. 12A). The toner T is supported in the direction of gravity G by the filter 83Y in the toner container 430Yc. The air chamber 430Yd does not contain the toner T. The filter 83Y is made of a porous member such as resin fibers. The pores of the filter 83Y have a size and density that permit the passage of air and restricts the passage of the toner T. In other words, the filter 83Y is configured to permit the passage of air and restrict the passage of the toner T.

As illustrated in FIG. 9E, the back surface 4300Ya of the first frame 430Ya has a discharge port 430Ya1 through which the toner T in the toner container 430Yc is discharged to the outside of the toner cartridge 430Y. The discharge port 430Ya1 is a through-hole extending through the first frame 430Ya in the X1-direction.

As illustrated in FIGS. 9A, 9C, and 9E, the bottom surface 4300Yb of the second frame 430Yb has a protrusion 4301 protruding downward. The protrusion 4301 has an intake port 430Yb1 (a container opening) formed as a through-hole extending through the second frame 430Yb in the Z-direction. The discharge port 430Ya1 and the intake port 430Yb1 communicate with the outside of the toner cartridge 430Y.

The discharge port 430Ya1 and the intake port 430Yb1 may be positioned on the sides of the toner cartridge 430Y other than the left and right sides. In other words, the discharge port 430Ya1 and the intake port 430Yb1 may be positioned on the sides of the toner cartridge 430Y excluding the side facing the Y1-direction in which the toner cartridges 430Y, 430M, 430C, and 430K are aligned. This allows for decreasing the gaps Gym, Gmc, and Gck between the toner cartridges 430Y, 430M, 430C, and 430K in the Y-direction (Y1-direction), as illustrated in FIG. 3A. This configuration may increase the widths of the toner cartridges 430Y, 430M, 430C, and 430K in the Y-direction, thereby increasing the toner capacities of the toner cartridges 430Y, 430M, 430C, and 430K.

The gap Gym is the gap in the Y-direction between the toner cartridge 430Y and the toner cartridge 430M. The gap Gmc is the gap in the Y-direction between the toner cartridge 430M and the toner cartridge 430C. The gap Gck is the gap in the Y-direction between the toner cartridge 430C and the toner cartridge 430K.

As illustrated in FIG. 10A, the bottom surface 4300Yb of the second frame 430Yb descends (upstream in the Z-direction) with a decreasing distance to the center in the Y1-direction. In other words, the bottom surface 4300Yb includes a first slope 4302 that descends with a decreasing distance to the downstream side in the Y1-direction and a second slope 4303 that descends with a decreasing distance to the upstream side in the Y1-direction. The boundary between the first slope 4302 and the second slope 4303 is the lowermost surface 430Yb2 of the bottom surface 4300Yb.

The protrusion 4301 is disposed so as to protrude downward from the second slope 4303 at a position shifted in the Y1-direction from the lowermost surface 430Yb2. As illustrated in FIG. 3B, the cartridge holder 429 includes a positioning portion 429*a* that engages with the protrusion 4301. In this embodiment, the positioning portion 429*a* is a rib provided at the edge of the opening of the cartridge holder 429 facing the ejection port 80Ya of the pump unit 80Y. The toner cartridge 430Y is positioned relative to the cartridge holder 429 by the engagement of the protrusion 4301 with the positioning portion 429*a*. At that time, the intake port 430Yb1 provided in the protrusion 4301 of the toner cartridge 430Y communicates with the ejection port 80Ya of the pump unit 80Y.

The protrusion 4301 having the intake port 430Yb1 is disposed at a position different in the Y1-direction from the lowermost portion 83Yb of the filter 83Y and the lowermost surface 430Yb2 of the second frame 430Yb. In other words, the protrusion 4301 is disposed in the space between the second slope 4303 and the cartridge holder 429. This configuration allows for efficiently using the space between the second slope 4303 and the cartridge holder 429, increasing the capacity of the toner cartridge 430Y.

The discharge port 430Ya1 provided at the first frame 430Ya of the toner cartridge 430Y is open upstream in the X1-direction. In other words, the discharge port 430Ya1 is open in the same direction as the direction in which the toner cartridge 430Y is attached to the cartridge holder 429. With this configuration, when the toner cartridge 430Y is attached to the cartridge holder 429 upstream in the X1-direction, the discharge port 430Ya1 can easily be engaged and communicated with the intake port 429Ya1 of the cartridge holder 429.

Not limited to the above arrangement, the discharge port 430Ya1 may be provided on the bottom surface 4300Yb or the upper surface of the toner cartridge 430Y, and the intake port 430Yb1 may be provided on the back surface 4300Ya or the upper surface of the toner cartridge 430Y. If there is enough space in the apparatus body 72, the discharge port 430Ya1 and the intake port 430Yb1 may be provided on the right and left sides of the toner cartridge 430Y.

The toner cartridge 430Y may include a sealing member (not shown) for sealing the discharge port 430Ya1. Examples of the sealing member include a seal and a shutter. In a case where the toner cartridge 430Y is not attached to the cartridge holder 429, sealing the discharge port 430Ya1 with the sealing member prevents the toner T in the toner container 430Yc from leaking out of the toner cartridge 430Y. If the sealing member is a seal, the sealing member is removed from the back surface 4300Ya of the toner cartridge 430Y when the toner cartridge 430Y is attached to the cartridge holder 429. If the sealing member is a shutter, the sealing member is moved relative to the back surface 4300Ya of the toner cartridge 430Y to open the discharge port 430Ya1 when the toner cartridge 430Y is attached to the cartridge holder 429.

As illustrated in FIG. 9A, a label 430Ys is provided on the front surface 4304 of the toner cartridge 430Y. The label 430Ys is used to indicate the color of the toner T contained in the toner cartridge 430Y. The label 430Ys is omitted in the drawings other than FIG. 9A. The label 430Ys may display a method for attaching the toner cartridge 430Y to the cartridge holder 429 or information on the toner cartridge 430Y. For example, the label 430Ys may display the toner capacity of the toner cartridge 430Y, toner expiration date, a method for storing the toner cartridge 430Y, and a method for stripping the sealing member.

As illustrated in FIGS. 10A to 10C, the exhaust pipe 85Y is disposed in the toner container 430Yc. The exhaust pipe 85Y includes an inlet 85Ya that is open downward in the direction of gravity G and an output 85Yb (a second pipe opening) which opens backward, that is, upstream in the X1-direction, to communicate with the discharge port 430Ya1 of the toner cartridge 430Y, thereby communicating with the outside of the toner cartridge 430Y. The output 85Yb is located above the inlet 85Ya. As illustrated in FIGS. 12A and 12B, the exhaust pipe 85Y includes a first pipe section 85Y1 including the inlet 85Ya and extending in the Z1-direction, or the direction of gravity G, and a second pipe section 85Y2 including the output 85Yb, connected to the discharge port 430Ya1, and extending in the X1-direction. The exhaust pipe 85Y is bent at an intermediate point. In this manner, the exhaust pipe 85Y (a pipe) connects the inlet 85Ya and the output 85Yb. The inlet 85Ya is opposed to the lowermost portion 83Yb (an opposing region of the filter 83Y, a predetermined region of the filter 83Y) with a space therebetween in the direction of gravity G. The opposing region of the filter 83Y facing the inlet 85Ya in the direction of gravity G may be part of the lowermost portion 83Yb. The exhaust pipe 85Y of this embodiment is made of resin but may be made of paper, rubber, or other materials.

Toner Conveying Mechanism

Next, a mechanism for conveying the toner T contained in the toner container 430Yc of the toner cartridge 430Y to the developer container 3Y of the process cartridge PY will be described. As illustrated in FIG. 6A, the air ejected upward from the ejection port 80Ya of the pump unit 80Y is taken into the air chamber 430Yd through the intake port 430Yb1 of the toner cartridge 430Y (see FIG. 10A). The air fills the air chamber 430Yd and flows into the toner container 430Yc through the filter 83Y.

The air that has flowed into the toner container 430Yc penetrates between the particles of the toner T, fluidizing the toner T. The pressure of the interior of the toner cartridge 430Y becomes positive due to the air flow from the pump unit 80Y. The air attempts to exit the toner cartridge 430Y through the discharge port 430Ya1 via the exhaust pipe 85Y. At this time, the toner T in the toner container 430Yc is moved together with the air through the exhaust pipe 85Y and is discharged to the outside of the toner cartridge 430Y through the discharge port 430Ya1. In other words, the exhaust pipe 85Y guides the toner T in the toner container 430Yc together with the air through the inlet 85Ya to the discharge port 430Ya1. In this embodiment, the discharge port 430Ya1 is open in the lateral direction of the toner cartridge 430Y (X1-direction).

The toner T discharged from the discharge port 430Ya1 moves toward the upstream end 444Yu of the supply pipe 444Y through the intake port 429Ya of the cartridge holder 429. The toner T is conveyed through the supply pipe 444Y by the air that has flowed into the supply pipe 444Y together with the toner T and is supplied through the downstream end 444Yd of the supply pipe 444Y to the developer container 3Y of the process cartridge PY. As illustrated in FIG. 5B, since the downstream end 444Yd of the supply pipe 444Y is connected to the upstream end of the developer container 3Y in the Y-direction (Y1-direction), the toner T is supplied to the upstream end of the developer container 3Y in the Y-direction.

As illustrated in FIG. 6B, the developer container 3Y includes therein stirring members SY1 and SY2 that stir the toner T in the developer container 3Y. Similarly, the developer containers 3M, 3C, and 3K include therein stirring members SM1 and SM2, stirring members SC1 and SC2, and stirring members SK1 and SK2, respectively.

The toner T in the developer container 3Y is homogenized by the rotation of the stirring members SY1 and SY2 and is conveyed in the Y-direction (Y1-direction). Although in this embodiment the stirring members are constituted by a rotation shaft and a sheet fixed to the rotation shaft, this configuration is illustrative only. For example, the stirring members may be screws configured to convey the toner T in the developer container 3Y along the Y-direction. In other words, the stirring members SY1, SY2, SM1, and SM2 may be screws that convey the toner T downstream in the Y-direction, and the stirring members SC1, SC2, SK1, and SK2 may be screws that convey the toner T upstream in the Y-direction.

Since not only the toner T but also air flow into the developer container 3Y, the pressure in the developer container 3Y rises. For this reason, in this embodiment, the upper surface of the developer container 3Y has a through-hole (not shown), and the through-hole is covered with an exhaust filter PYf as illustrated in FIGS. 3A and 5B. The exhaust filter PYf is made of a non-woven fabric or the like to permit the passage of air and restrict the passage of toner. As a result, the toner T that has flowed into the developer container 3Y is restricted from being discharged outside by the exhaust filter PYf, remaining in the developer container 3Y. In contrast, at least part of the air that has flowed into the developer container 3Y passes through the exhaust filter PYf and is discharged to the outside of the developer container 3Y. This may restrict an increase in the internal pressure of the developer container 3Y, allowing for the smooth replenishment of toner into the developer container 3Y.

Similarly, the upper surfaces of the developer containers 3M, 3C, and 3K include exhaust filters PMf, PCf, and PKf and through-holes (not shown) covered by the exhaust filters PMf, PCf, and PKf, respectively.

The exhaust filter PYf and the through-hole are positioned at the center of the developer container 3Y in the Y-direction. The numbers of exhaust filters and through-holes are not limited to one; multiple exhaust filters and through-holes may be provided for the developer container 3Y. For example, as illustrated in FIGS. 3A and 5B, in addition to the exhaust filter PYf, exhaust filters PYfa and PYfb may be provided for the developer container 3Y. The exhaust filters PYfa and PYfb cover the through-holes (not shown) provided at the developer container 3Y. The exhaust filter PYfa is disposed upstream of the exhaust filter PYf in the Y-direction. The exhaust filter PYfb is disposed downstream of the exhaust filter PYf in the Y-direction. Thus, providing multiple exhaust filters and through-holes for one developer container efficiently prevents an increase in the internal pressure of the developer container.

As described above, the toner T contained in the toner cartridge 430Y is conveyed together with air into the developer container 3Y. In the case of a configuration in which the direction of the conveying path changes midway, as in the supply pipes 444Y, 444M, 444C, and 444K of this embodiment, and a configuration in which the conveying path differs depending on the color of the toner T, the toner T may be conveyed using air. By conveying the toner T using air, the design flexibility of the toner conveying path is improved, and the need for a member for conveying the toner T, such as a screw, is eliminated, which reduces the number of components, decreasing the cost.

Detailed Configuration of Toner Cartridge

Referring next to FIGS. 10A to 12B, the detailed configuration of the toner cartridge 430Y will be described. In particular, the joining of the first frame 430Ya, the second frame 430Yb, and the filter 83Y of the toner cartridge 430Y will be described in detail hereinbelow. As illustrated in FIGS. 10A to 12B, the first frame 430Ya includes a first box 4305 that forms the toner container 430Yc together with the bottom surface 83Yd of the filter 83Y and a first flange 430Ya2 extending in a substantially horizontal direction from the lower edge of the first box 4305 to the outside of the toner container 430Yc. The first box 4305 is formed in a substantially rectangular parallelepiped shape.

The first flange 430Ya2 is formed along the whole circumference of the lower edge of the first box 4305.

The second frame 430Yb is separate from the first frame 430Ya and includes a second box 4306 which forms the air chamber 430Yd together with the bottom surface 83Yd of the filter 83Y and a second flange 430Yb3 extending from the upper edge of the second box 4306 to the outside of the air chamber 430Yd in a substantially horizontal direction. The second flange 430Yb3 is formed along the whole circumference of the upper edge of the second box 4306.

The filter 83Y is formed in a rectangular sheet-like shape. The filter 83Y includes a bottom surface 83Yd serving as a partition for the air chamber 430Yd and the toner container 430Yc and an outer edge 83Ya (a sandwiched portion) held between the first flange 430Ya2 and the second flange 430Yb3. The outer edge 83Ya continues to the bottom surface 83Yd. The bottom surface 83Yd is formed to approach the lowermost portion 83Yb of the filter 83Y in the longitudinal direction (Y1-direction) as it descends in the direction of gravity G, constituting the bottom surface of the toner container 430Yc. In other words, as viewed in the X1-direction, the bottom surface 83Yd descends toward the lowermost portion 83Yb in the direction of gravity G as it approaches the lowermost portion 83Yb of the filter 83Y in the Y1-direction.

As illustrated in FIG. 10C, the bottom surface 83Yd includes a first slope 83Yd1, which descends toward the lowermost portion 83Yb from one end (the upstream end) of the bottom surface 83Yd in the Y1-direction and a second slope 83Yd1, which descends toward the lowermost portion 83Yb from the other end (the downstream end) of the bottom surface 83Yd in the Y1-direction.

In other words, as viewed in the X1-direction, the lowermost portion 83Yb of the filter 83Y is disposed between the opposite ends (a first end and a second end) of the toner cartridge 430Y in the Y1-direction. The first slope 83Yd1 (a first portion) descends toward the lowermost portion 83Yb from the first end in the Y1-direction. The second slope 83Yd2 (a second portion) descends toward the lowermost portion 83Yb from the second end in the Y1-direction.

The bottom surface 83Yd includes an intermediate portion 457 which is disposed between the first slope 83Yd1 and the second slope 83Yd2 in the Y1-direction and in which the lowermost portion 83Yb is located. The intermediate portion 457 is curved so as to smoothly connect the first slope 83Yd1 and the second slope 83Yd2. The intermediate portion 457 may be omitted, and the first slope 83Yd1 and the second slope 83Yd2 may be directly connected.

As illustrated in FIG. 10D, the first flange 430Ya2 of the first frame 430Ya includes a first joining surface 431, a second joining surface 432, a third joining surface 433, and a fourth joining surface 434. The second flange 430Yb3 of the second frame 430Yb includes a first joining surface 441, a second joining surface 442, a third joining surface 443, and a fourth joining surface 445. The outer edge 83Ya of the filter 83Y includes a first edge 451, a second edge 452, a third edge 453, and a fourth edge 454.

The first joining surface 431 and the second joining surface 432 of the first flange 430Ya2 extend in the X1-direction in a planer shape. The first joining surface 431 and the second joining surface 432 continue to the third joining surface 433 and the fourth joining surface 434, respectively. The first joining surface 431 is provided at the left end of the first flange 430Ya2. The second joining surface 432 is provided at the right end of the first flange 430Ya2. The third joining surface 433 is provided at the front end of the first flange 430Ya2. The fourth joining surface 434 is provided at the rear end of the first flange 430Ya2. Since the third joining surface 433 and the fourth joining surface 434 have the same configuration, the third joining surface 433 will be mainly described.

The third joining surface 433 has a first inclined surface 433*a* that descends toward the downstream side in the Y1-direction, a second inclined surface 433*b* that descends toward the upstream side in the Y1-direction, and an intermediate surface 433*c*. As viewed in the X1-direction, the first inclined surface 433*a* descends toward the lowermost portion 83Yb in the direction of gravity G as it approaches the lowermost portion 83Yb in the Y1-direction. As viewed in the X1-direction, the second inclined surface 433*b* is disposed on the opposite side of the lowermost portion 83Yb from the first inclined surface 433*a* in the Y1-direction and descends toward the lowermost portion 83Yb in the direction of gravity G as it approaches the lowermost portion 83Yb. The intermediate surface 433*c* is provided between the first inclined surface 433*a* and the second inclined surface 433*b* in the Y1-direction as viewed in the X1-direction and is curved to smoothly connect the first inclined surface 433*a* and the second inclined surface 433*b*.

The intermediate surface 433*c* may be omitted, and the first inclined surface 433*a* and the second inclined surface 433*b* may be directly connected. The intermediate surface 433*c* may be formed in a planar shape. Not the entire first inclined surface 433*a* but part of the first inclined surface 433*a* may constitute an inclined surface or a holding surface.

The first joining surface 441 and the second joining surface 442 of the second flange 430Yb3 extend in the X1-direction to form a flat shape. The first joining surface 441 is provided at the left end of the second flange 430Yb3. The second joining surface 442 is provided at the right end of the second flange 430Yb3. The third joining surface 443 is provided at the front end of the second flange 430Yb3. The fourth joining surface 445 is provided at the rear end of the second flange 430Yb3. Since the third joining surface 443 and the fourth joining surface 445 are similarly configured, the third joining surface 443 will be mainly described.

The third joining surface 443 has a first inclined surface 443*a* (a holding surface or a first holding surface) that descends downstream in the Y1-direction, a second inclined surface 443*b* (a second holding surface) that descends upstream in the Y1-direction, and an intermediate surface 443*c* (an intermediate holding surface). The first inclined surface 443*a*, the second inclined surface 443*b*, and the intermediate surface 443*c* face the first inclined surface 433*a*, the second inclined surface 433*b*, and the intermediate surface 433*c*, respectively, in the direction of gravity G. In other words, the first inclined surface 443*a*, the second inclined surface 443*b*, and the intermediate surface 443*c* are aligned with the first inclined surface 433*a*, the second inclined surface 433*b*, and the intermediate surface 433*c* in the direction of gravity G, respectively. The intermediate surface 443*c* is provided between the first inclined surface 443*a* and the second inclined surface 443*b* in the Y1-direction as viewed in the X1-direction and is curved to smoothly connect the first inclined surface 443*a* and the second inclined surface 443*b*. The first inclined surface 443*a* and the second inclined surface 443*b* descend toward the lowermost portion 83Yb of the filter 83Y in the Y1-direction along the first inclined surface 433*a* and the second inclined surface 433*b* as viewed in the X1-direction. The intermediate surface 443*c* may be omitted, and the first inclined surface 443*a* and the second inclined surface 443*b* may be directly connected. The intermediate surface 443*c* may be formed in a planar shape. Not the entire first inclined surface 443*a* but part of the first inclined surface 443*a* may constitute an inclined surface or a holding surface.

The first edge 451 and the second edge 452 of the outer edge 83Ya of the filter 83Y extend in the X1-direction in a flat shape. The first edge 451 is provided at the left end of the outer edge 83Ya. The second edge 452 is provided at the right end of the outer edge 83Ya. The third edge 453 is provided at the front end of the outer edge 83Ya. The fourth edge 454 is provided at the rear end of the outer edge 83Ya. Since the third edge 453 and the fourth edge 454 are similarly configured, the third edge 453 will be mainly described.

The third edge 453 includes a first slope 453*a* that descends downstream in the Y1-direction, a second slope 453*b* that descends upstream in the Y1-direction, and an intermediate portion 453*c*. The intermediate surface 453*c* is provided between the first inclined surface 453*a* and the second inclined surface 453*b* in the Y1-direction as viewed in the X1-direction and is curved to smoothly connect the first inclined surface 453*a* and the second inclined surface 453*b*. The first inclined surface 453*a* and the second inclined surface 453*b* descend toward the lowermost portion 83Yb of the filter 83Y in the Y1-direction as viewed in the X1-direction. The intermediate surface 453*c* may be omitted, and the first inclined surface 453*a* and the second inclined surface 453*b* may be directly connected. The intermediate surface 453*c* may be formed in a planar shape.

The first edge 451 of the filter 83Y is held between the first joining surface 431 of the first flange 430Ya2 and the first joining surface 441 of the second flange 430Yb3. The second edge 452 of the filter 83Y is held between the second joining surface 432 of the first flange 430Ya2 and the second joining surface 442 of the second flange 430Yb3. The third edge 453 of the filter 83Y is held between the third joining surface 433 of the first flange 430Ya2 and the third joining surface 443 of the second flange 430Yb3. The fourth edge 454 of the filter 83Y is held between the fourth joining surface 434 of the first flange 430Ya2 and the fourth joining surface 445 of the second flange 430Yb3.

More specifically, the first slope 453*a* (a first held part) is held between the first inclined surfaces 433*a* and 443*a* along the first inclined surface 433*a*. The second slope 453*b* (a second held part) is held between the second inclined surfaces 433*b* and 443*b* along the second inclined surface 433*b*. The intermediate portion 453*c* (an intermediate held part) is held between the intermediate surfaces 433*c* and 443*c* along the intermediate surface 433*c*. The first edge 451 (a third held part) extends in the X1-direction as viewed in the direction of gravity G and is held between the first joining surfaces 431 and 441 along the first joining surface 431.

The first flange 430Ya2 and the second flange 430Yb3 are joined by individually ultrasonically welding the first joining surfaces 431 and 441, the second joining surfaces 432 and 442, the third joining surfaces 433 and 443, and the fourth joining surfaces 434 and 445. The third joining surfaces 433 and 443 and the fourth joining surfaces 434 and 445 are disposed so as to be aligned with the bottom surface 83Yd of the filter 83Y as viewed in the lateral direction (X1-direction). The first flange 430Ya2 and the second flange 430Yb3 may be fixed to each other not only by ultrasonic welding but also by thermal welding, adhesives such as double-sided tape and a hot-melt adhesive, or screws.

By joining the first flange 430Ya2 and the second flange 430Yb3 together, the filter 83Y interposed between the first flange 430Ya2 and the second flange 430Yb3 is retained. If the retaining force for the filter 83Y is insufficient, the whole circumference of the outer edge 83Ya of the filter 83Y may be bonded to at least one of the first flange 430Ya2 and the second flange 430Yb3. This allows for retaining the filter 83Y with a high retaining force.

Since the filter 83Y is retained by the first flange 430Ya2 and the second flange 430Yb3, the filter 83Y is held along the joining surfaces of the first flange 430Ya2 and the second flange 430Yb3. In particular, since the third edge 453 of the filter 83Y is held between the third joining surfaces 433 and 443 formed in a substantially V shape, and the fourth edge 454 of the filter 83Y is held between the fourth joining surfaces 434 and 445 formed in a substantially V-shape, the filter 83Y is held in a substantially V-shape orientation with the lowermost portion 83Yb as the lower end.

The lowermost portion 83Yb of the filter 83Y extends in the lateral direction (X1-direction), and the bottom surface 83Yd of the filter 83Y extends parallel to the lateral direction (X1-direction) across the entire region in the lateral direction (X1-direction). In other words, the bottom surface 83Yd is equally distant from the output 85Yb in the direction of gravity G or the Z1-direction across the entire region in the lateral direction (X1-direction) in a predetermined cross-section perpendicular to the longitudinal direction (Y1-direction). In other words, as illustrated in FIG. 12A, the distance GD in the Z1-direction between the center 430Ya5 of the discharge port 430Ya1 and the bottom surface 83Yd is equal in an X1-Z1 plane across the entire region in the lateral direction (X1-direction). The first joining surface 431, which is a flat surface, of the first flange 430Ya2 extends in the X1-direction such that the distance from the inlet 85Ya in the direction of gravity G does not change as viewed in the Y1-direction. Similarly, the first joining surface 441 (a third holding surface) of the second flange 430Yb3 extends in the X1-direction so as not to change in the distance from the inlet 85Ya in the direction of gravity G as viewed in the Y1-direction. The first joining surface 441 faces the first joining surface 431 in the direction of gravity G. In other words, the first joining surface 441 is disposed at the position aligned with the first joining surface 431 in the direction of gravity G. As illustrated in FIG. 10A, the first joining surfaces 431 and 441 are located above the inlet 85Ya in the direction of gravity G.

In other words, the filter 83Y has a shape in which a single rectangular sheet is folded in a valley shape at the lowermost portion 83Yb and does not have any complex three-dimensional irregular shape. This allows for forming the filter 83Y with a sheet-like non-woven fabric such as resin fibers and eliminates the need for forming the filter 83Y into a three-dimensional shape by thermal pressing or the like. In other words, the filter 83Y is a flat sheet when the outer edge 83Ya is not held between the first frame 430Ya and the second frame 430Yb. This allows for holding the filter 83Y in a substantially V-shape while forming the filter 83Y at low cost. The sheet-like filter 83Y can be thinner than members formed by thermal pressing or the like and can increase the toner capacity of the toner cartridge 430Y.

The inlet 85Ya (a first pipe opening) of the exhaust pipe 85Y is opposed to the lowermost portion 83Yb of the filter 83Y with a gap therebetween. The filter 83Y is held in the substantially V-shaped orientation, with the lowermost portion 83Yb as the lower end, so that when the amount of toner T remaining in the toner container 430Yc becomes low, the toner T fluidized by air moves along the incline of the filter 83Y and gathers to the lowermost portion 83Yb. In other words, the toner T in the toner container 430Yc can be guided to the inlet 85Ya of the exhaust pipe 85Y.

The bottom surface 83Yd of the filter 83Y extends parallel to the lateral direction (X1-direction) and is inclined only in the longitudinal direction (Y1-direction). This allows the toner T to be gathered to the lowermost portion 83Yb of the filter 83Y with a simple configuration.

For this reason, even if the amount of toner T remaining in the toner container 430Yc becomes low, the toner T gathered to the lowermost portion 83Yb can be efficiently discharged to the outside of the toner cartridge 430Y from the inlet 85Ya of the exhaust pipe 85Y through the discharge port 430Ya1. Although the discharge port 430Ya1 is disposed above the inlet 85Ya and the bottom surface 83Yd of the filter 83Y, the toner T is conveyed from the inlet 85Ya to the discharge port 430Ya1 by air. Thus, the amount of toner T not supplied and remaining in the toner container 430Yc can be reduced.

To move the toner T along the slope only with its own weight, the angle of inclination θ of the slope relative to the horizontal plane needs to be commonly set to about 70 degrees. However, in this embodiment, since the toner T on the filter 83Y in the toner container 430Yc is fluidized by air, the angle of inclination θ of the slope of the filter 83Y relative to the horizontal plane is set to about 10 to 20 degrees, as illustrated in FIG. 10A. This configuration may increase the capacity of the toner cartridge 430Y, thereby increasing the amount of toner T that the toner cartridge 430Y can contain.

In this embodiment, the first frame 430Ya and the second frame 430Yb have the third joining surfaces 433 and 443 that are in contact with the third edge 453 of the outer edge 83Ya of the filter 83Y and that are inclined in the longitudinal direction (Y1-direction) and the direction of gravity G, respectively. This configuration is illustrative only. In other words, at least one of the first frame 430Ya and the second frame 430Yb may have the third joining surface 433, and at least the other of the first frame 430Ya and the second frame 430Yb may have a holding surface that holds the third edge 453 together with the third joining surface 433. For example, of the first frame 430Ya and the second frame 430Yb, only the first frame 430Ya may have the third joining surface 433 that is in contact with the third edge 453 and that is inclined in the longitudinal direction (Y1-direction) and the direction of gravity G. In this case, the third joining surface 443 (a holding surface) of the second frame 430Yb may be formed parallel to the Y1-Z1 plane, and a sealing member (not shown) may be provided between the third joining surface 433 and the third joining surface 443.

Second Embodiment

Next, a second embodiment of the present disclosure will be described. The second embodiment is configured such that the joining surface of the first flange 430Ya2 and the second flange 430Yb3 of the first embodiment is formed in an arch shape. Therefore, the same configuration as in the first embodiment will be omitted from the illustrations or described with the same reference signs in the drawings.

Figure 13A:
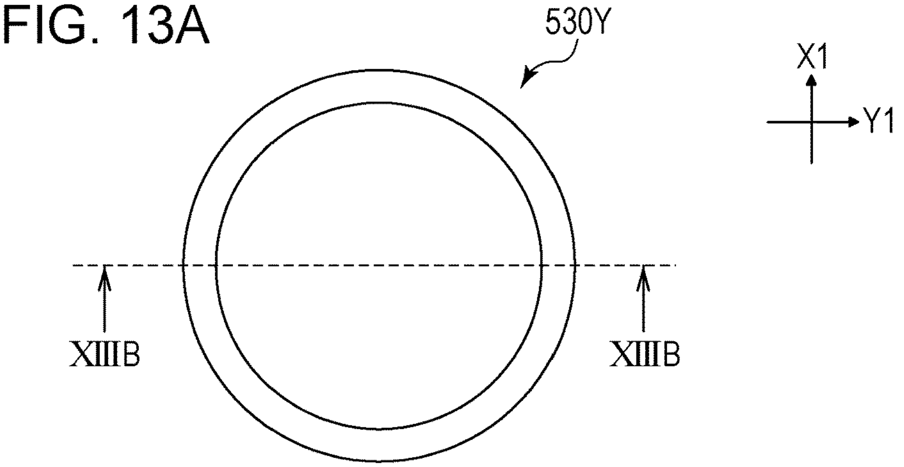
FIG. 13A is a plan view of a toner cartridge according to a second embodiment.
Figure 13B:
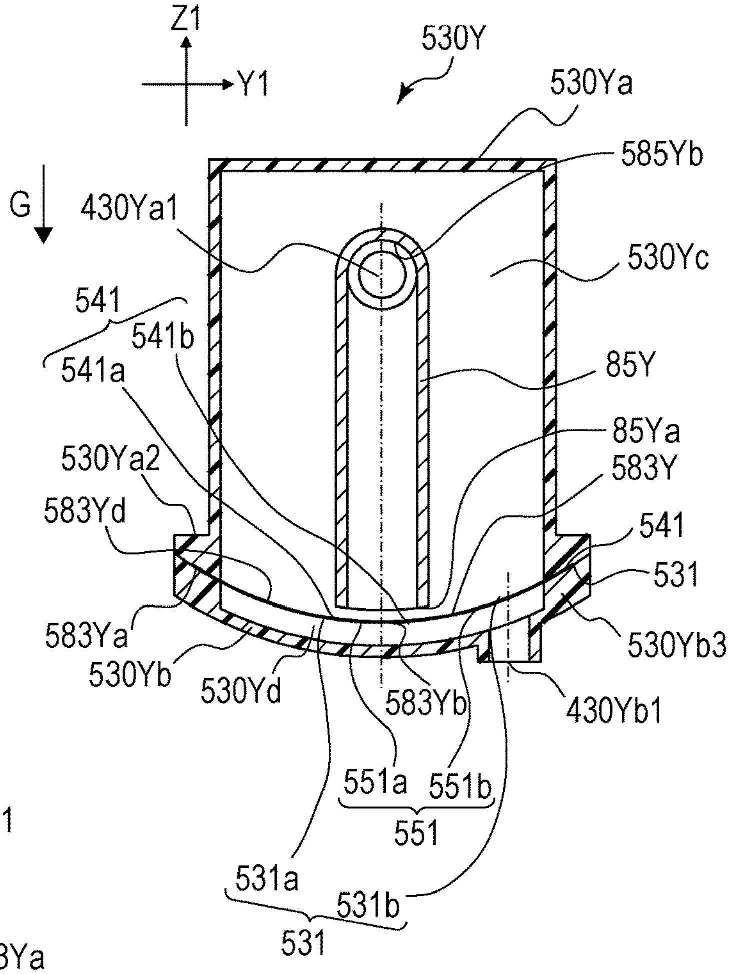
FIG. 13B is a cross-sectional view of the toner cartridge in in FIG. 13A taken along line XIIIB-XIIIB.
Figure 13C:
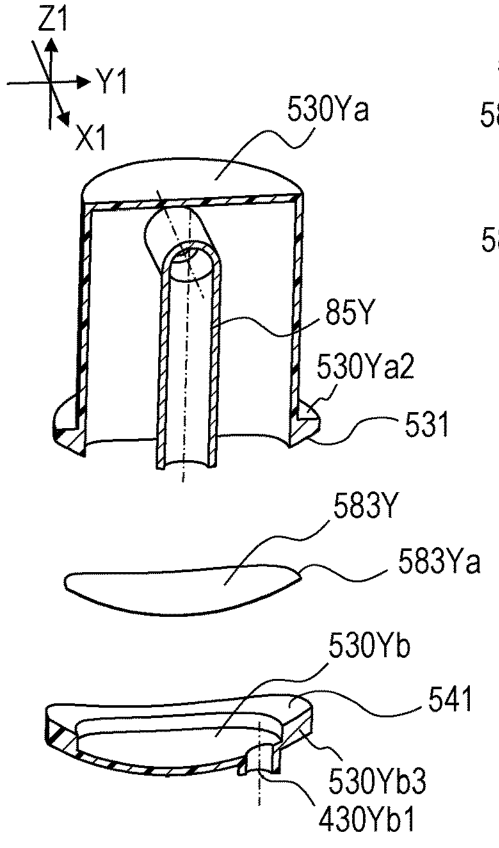
FIG. 13C is an exploded perspective view of the toner cartridge taken on a Y1-Z1 plane.

FIG. 13A is a plan view of a toner cartridge 530Y. FIG. 13B is a cross-sectional view of the toner cartridge 530Y in FIG. 13A taken along line XIIIB-XIIIB. FIG. 13C is an exploded perspective view of the toner cartridge 530Y taken along a Y1-Z1 plane.

As illustrated in FIGS. 13A to 13C, the toner cartridge 530Y (a cartridge) is formed in a substantially cylindrical shape and includes a first frame 530Ya (a second container), a second frame 530Yb (a first container), a filter 583Y, and an exhaust pipe 85Y.

The internal space of the toner cartridge 530Y is partitioned by the filter 583Y into a toner container 530Yc (a second chamber) and an air chamber 530Yd (a first chamber). The air chamber 530Yd is disposed below the filter 583Y, and the toner container 530Yc is disposed above the filter 583Y.

The first frame 530Ya includes a first flange 530Ya2. The second frame 530Yb includes a second flange 530Yb3. The first flange 530Ya2 and the second flange 530Yb3 are formed around the whole circumference of the toner cartridge 530Y. The filter 583Y is formed in a circular sheet-like shape and has an outer edge 583Ya held between the first flange 530Ya2 and the second flange 530Yb3.

The first flange 530Ya2 has a joining surface 531 formed in an arch shape in a X1-Y1 cross-section. The second flange 530Yb3 has a joining surface 541 formed in an arch shape and facing the joining surface 531. In other words, the joining surface 541 is disposed at a position aligned with the joining surface 531 in the direction of gravity G.

The filter 583Y has a bottom surface 583Yd serving as a partition between the air chamber 530Yd and the toner container 530Yc and an outer edge 583Ya held between the first flange 530Ya2 and the second flange 530Yb3. The bottom surface 583Yd is curved toward a lowermost portion 583Yb (an opposing region) of the filter 583Y in longitudinal direction (Y1-direction), as it descends in the direction of gravity G.

The bottom surface 583Yd extends parallel to the lateral direction (X1-direction) over the entire region in the lateral direction (X1-direction). In other words, the bottom surface 583Yd is equal in the distance from the output 85Yb in the direction of gravity G or the Z1-direction over the entire region in the lateral direction (X1-direction) in a predetermined cross-section perpendicular to the longitudinal direction (Y1-direction). Like the bottom surface 583Yd, the joining surface 531 of the first flange 530Ya2 and the joining surface 541 of the second flange 530Yb3 are curved to approach the lowermost portion 583Yb of the filter 583Y in the longitudinal direction (Y1-direction) as it descends in the direction of gravity G.

More specifically, as viewed in the X1-direction, the joining surface 531 has a first curved surface 531*a* that descends toward the lowermost portion 583Yb in the Y1-direction and a second curved surface 531*b* that is disposed on the opposite side of the lowermost portion 583Yb from the first curved surface 531*a* in the Y1-direction and that descends toward the lowermost portion 583Yb. The joining surface 541 also has a first curved surface 541*a* formed along the first curved surface 531*a* and a second curved surface 541*b* formed along the second curved surface 531*b* as viewed in the X1-direction. The first curved surface 531*a* constitutes an inclined surface (a first inclined surface). The first curved surface 541*a* constitutes a holding surface (a first holding surface). The second curved surface 531*b* constitutes a second inclined surface. The second curved surface 541*b* constitutes a second holding surface. The first curved surfaces 531*a* and 541*a* and the second curved surfaces 531*b* and 541*b* are curved surfaces. The curved surfaces are included in the inclined surfaces.

The outer edge 583Ya of the filter 583Y is held between the joining surface 531 of the first flange 530Ya2 and the joining surface 541 of the second flange 530Yb3. In other words, the outer edge 583Ya has a first curved portion 551*a* (a first held part) held between the first curved surfaces 531*a* and 541*a* along the first curved surface 531*a* and a second curved portion 551*b* (a second held part) held between the second curved surfaces 531*b* and 541*b* along the second curved surface 531*b*.

The first flange 530Ya2 and the second flange 530Yb3 are joined by ultrasonically welding the joining surfaces 531 and 541. The first flange 530Ya2 and the second flange 530Yb3 may be fixed to each other not only by ultrasonic welding but also by thermal welding, adhesives such as double-sided tape and a hot-melt adhesive, or screws.

By joining the first flange 530Ya2 and the second flange 530Yb3 together, the filter 583Y interposed between the first flange 530Ya2 and the second flange 530Yb3 is retained. Since the filter 583Y is retained by the first flange 530Ya2 and the second flange 530Yb3, the filter 583Y is held along the respective joining surfaces 531 and 532 of the first flange 530Ya2 and the second flange 530Yb3.

In other words, the filter 583Y has a shape in which a single circular sheet is curved in an arc shape as the lowermost portion 583Yb as the bottom and does not have any complex three-dimensional irregular shape.

This allows for forming the filter 583Y with a sheet-like non-woven fabric such as resin fibers and eliminates the need for forming the filter 583Y into a three-dimensional shape by thermal pressing or the like. This allows for holding the filter 583Y in a curved shape while forming the filter 583Y at low cost. The sheet-like filter 583Y can be thinner than members formed by thermal pressing or the like and can increase the toner capacity of the toner cartridge 530Y.

The inlet 85Ya of the exhaust pipe 85Y is opposed to the lowermost portion 583Yb of the filter 583Y with a gap therebetween. The filter 583Y is held in a curved orientation, with the lowermost portion 583Yb as the lower end, so that when the amount of toner T remaining in the toner container 530Yc becomes low, the toner T fluidized by air moves along the arc surface of the filter 583Y and gathers to the lowermost portion 583Yb. In other words, the toner T in the toner container 530Yc can be guided to the inlet 85Ya of the exhaust pipe 85Y.

For this reason, even if the amount of toner T remaining in the toner container 530Yc becomes low, the toner T gathered to the lowermost portion 583Yb can be efficiently discharged to the outside of the toner cartridge 530Y from the inlet 85Ya of the exhaust pipe 85Y. Thus, the amount of toner T not supplied and remaining in the toner container 530Yc can be reduced.

Third Embodiment

Next, a third embodiment of the present disclosure will be described. The third embodiment is configured such that the joining surface of the first flange 430Ya2 and the second flange 430Yb3 of the first embodiment is uniformly inclined. Therefore, the same configuration as in the first embodiment will be omitted from the illustrations or described with the same reference signs in the drawings.

Figure 14A:
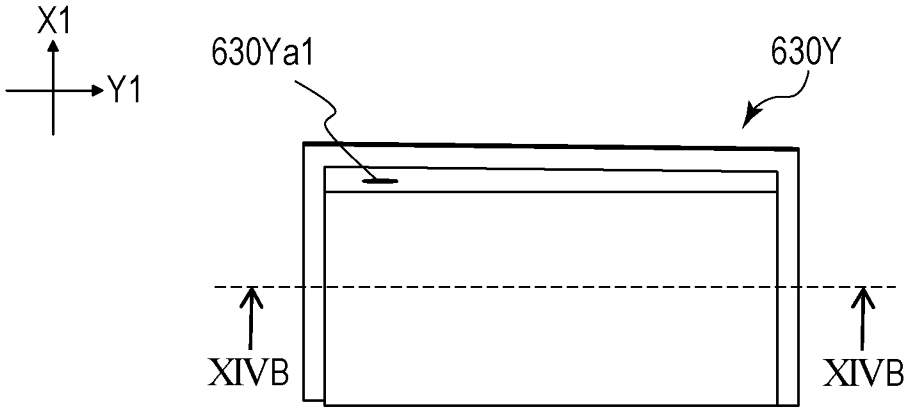
FIG. 14A is a plan view of a toner cartridge according to a third embodiment.
Figure 14B:
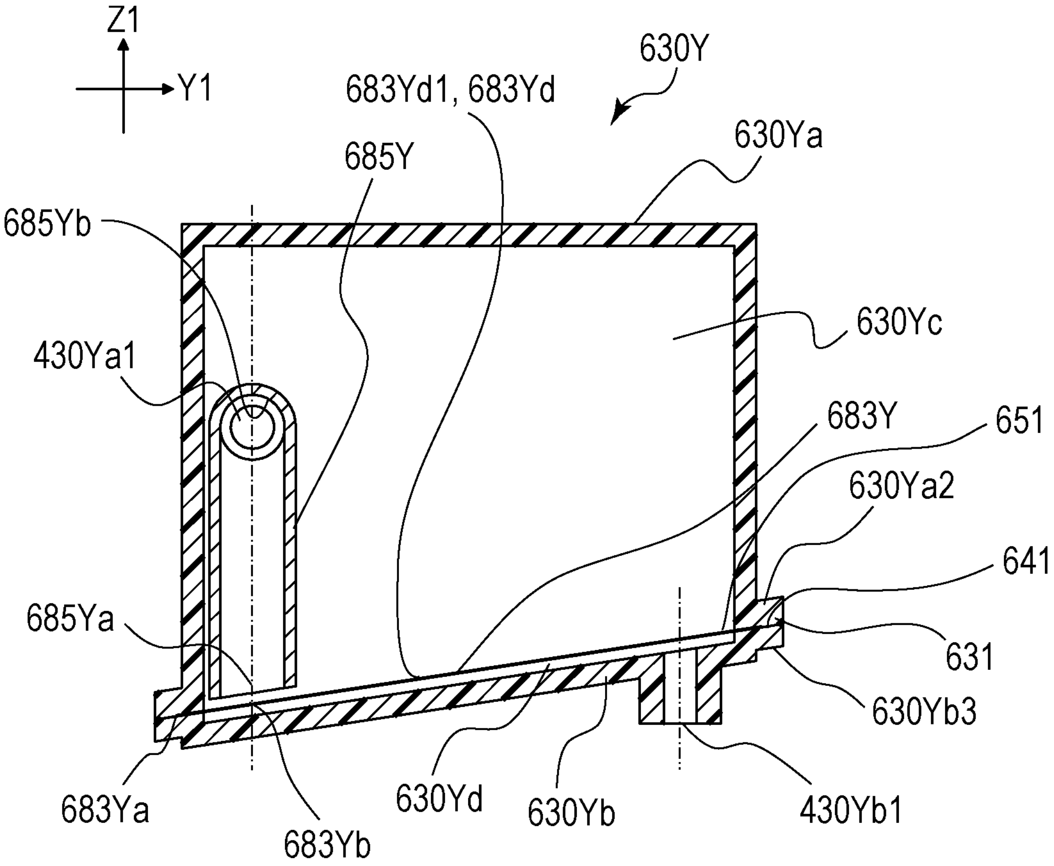
FIG. 14B is a cross-sectional view of the toner cartridge in FIG. 14A taken along line XIVB-XIVB.

FIG. 14A is a plan view of a toner cartridge 630Y. FIG. 14B is a cross-sectional view of the toner cartridge 630Y in FIG. 14A taken along line XIVB-XIVB. As illustrated in FIGS. 14A and 14B, the toner cartridge 630Y (a cartridge) includes a first frame 630Ya (a second container), a second frame 630Yb (a first container), a filter 683Y, and an exhaust pipe 685Y (a pipe). The internal space of the toner cartridge 630Y is partitioned by the filter 683Y into a toner container 630Yc (a second chamber) and an air chamber 630Yd (a first chamber). The air chamber 630Yd is disposed below the filter 683Y. The toner container 630Yc is disposed above the filter 683Y.

The first frame 630Ya includes a first flange 630Ya2. The second frame 630Yb includes a second flange 630Yb3. The first flange 630Ya2 and the second flange 630Yb3 are formed around the whole circumference of the toner cartridge 630Y. The filter 683Y is formed in a rectangular sheet-like shape and has an outer edge 683Ya held between the first flange 630Ya2 and the second flange 630Yb3.

The first flange 630Ya2 has a uniformly sloped joining surface 631 that descends toward the left. The second flange 630Yb3 also has a uniformly sloped joining surface 641 that descends toward the left. In other words, the joining surfaces 631 and 641 are slopes extending in the Y1-direction as it moves toward the Z1-direction.

The filter 683Y has a bottom surface 683Yd serving as a partition between the air chamber 630Yd and the toner container 630Yc and an outer edge 683Ya held between the first flange 630Ya2 and the second flange 630Yb3. The bottom surface 683Yd extends parallel to the lateral direction (X1-direction) over the entire region in the lateral direction (X1-direction). In other words, the bottom surface 683Yd is equal in the distance from an output 685Yb (a second pipe opening) of the exhaust pipe 685Y in the direction of gravity G or the Z1-direction over the entire region in the lateral direction (X1-direction) in a predetermined cross-section perpendicular to the longitudinal direction (Y1-direction).

In this embodiment, a lowermost portion 683Yb (an opposing region of the filter 683Y) is located at the upstream end (one end or a left end) of the bottom surface 683Yd in the Y1-direction. The bottom surface 683Yd is formed so as to approach the lowermost portion 683Yb in the longitudinal direction (Y1-direction) as it descends in the direction of gravity G to form the bottom surface of the toner container 630Yc. As illustrated in FIG. 14B, the bottom surface 683Yd includes a slope 683Yd1 that descends as it moves from the downstream end (the other end or a right end) of the bottom surface 683Yd toward the lowermost portion 683Yb in the Y1-direction.

In other words, assuming that the opposite ends of the toner cartridge 630Y in the Y1-direction are a first end and a second end as viewed in the X1-direction, the lowermost portion 683Yb of the filter 683Y is disposed at the second end in the Y1-direction. The slope 683Yd1 (a part) descends as it moves from the first end toward the lowermost portion 683Yb in the Y1-direction.

The joining surface 631 of the first flange 630Ya2 is an inclined surface that descends from the other end of the joining surface 631 to one end in the longitudinal direction (Y1-direction). The joining surface 641 of the second flange 630Yb3 also has the same configuration as the joining surface 631. In other words, the joining surface 641 (a holding surface) faces the joining surface 631 (an inclined surface) in the direction of gravity G and is inclined along the joining surface 631. In other words, the joining surface 641 is disposed at a position aligned with the joining surface 631 in the direction of gravity G.

The outer edge 683Ya of the filter 683Y is held between the joining surface 631 of the first flange 630Ya2 and the joining surface 641 of the second flange 630Yb3. In other words, the outer edge has an inclined portion 651 (a first held part) held between the joining surfaces 631 and 641 along the joining surface 631. The first flange 630Ya2 and the second flange 630Yb3 are joined by ultrasonically welding the joining surfaces 631 and 641. The first flange 630Ya2 and the second flange 630Yb3 may be fixed to each other not only by ultrasonic welding but also by thermal welding, adhesives such as double-sided tape and a hot-melt adhesive, or screws.

By joining the first flange 630Ya2 and the second flange 630Yb3 together, the filter 683Y interposed between the first flange 630Ya2 and the second flange 630Yb3 is retained. Since the filter 683Y is retained by the first flange 630Ya2 and the second flange 630Yb3, the filter 683Y is held along the respective joining surfaces 631 and 632 of the first flange 630Ya2 and the second flange 630Yb3.

In other words, the filter 683Y has a straight shape in which the left end is lowest in the Z1-direction and the right end is highest in the Z1-direction and does not have any complex three-dimensional irregular shape. This allows for forming the filter 683Y with a sheet-like non-woven fabric such as resin fibers and eliminates the need for forming the filter 683Y into a three-dimensional shape by thermal pressing or the like. This allows for holding the filter 683Y in a straight shape while forming the filter 683Y at low cost. The sheet-like filter 683Y can be thinner than members formed by thermal pressing or the like and can increase the toner capacity of the toner cartridge 630Y.

An inlet 685Ya (a first pipe opening) of the exhaust pipe 685Y is opposed to the lowermost portion 683Yb of the filter 683Y with a gap therebetween. The lowermost portion 683Yb is located at the lowermost position of the filter 683Y in the toner container 630Yc.

When the amount of toner T remaining in the toner container 630Yc becomes low, the toner T fluidized by air moves along the slope of the filter 683Y and gathers to the lowermost portion 683Yb. In other words, the toner T in the toner container 630Yc can be guided to the inlet 685Ya of the exhaust pipe 685Y.

For this reason, even if the amount of toner T remaining in the toner container 630Yc becomes low, the toner T gathered to the lowermost portion 683Yb can be efficiently discharged to the outside of the toner cartridge 630Y from the inlet 685Ya of the exhaust pipe 685Y. Thus, the amount of toner T not supplied and remaining in the toner container 630Yc can be reduced.

Fourth Embodiment

Next, a fourth embodiment of the present disclosure will be described. The fourth embodiment is configured such that the width Lb2 of each toner cartridge in the Y-direction is shorter than the length W2 in the X-direction. Therefore, the same configuration as in the first embodiment will be omitted from the illustrations or described with the same reference signs in the drawings.

In the first embodiment, the widths of the toner cartridges 430Y, 430M, 430C, and 430K in the Y-direction (or the Y1-direction) are longer than the lengths in the X-direction (or the X1-direction). For this reason, the third joining surfaces 433 and 443 and the fourth joining surfaces 434 and 445 extending in the Y1-direction are inclined in a substantially V-shape.

However, this embodiment is configured such that the width Lb2 of a toner cartridge 730Y in the Y-direction is shorter than the length W2 in the X-direction. Therefore, the joining surface of the toner cartridge 730Y extending in the X-direction is inclined in a substantially V-shape.

Figure 15A:
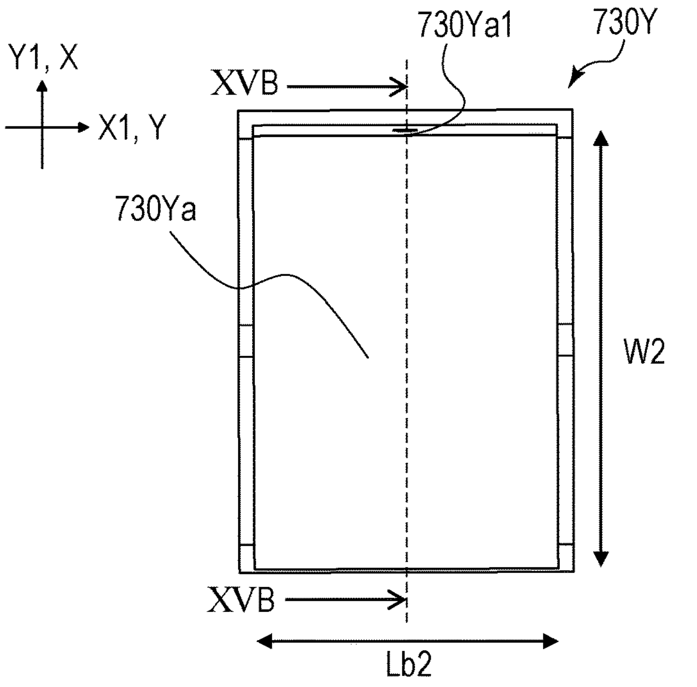
FIG. 15A is a plan view of a toner cartridge according to a fourth embodiment.
Figure 15B:
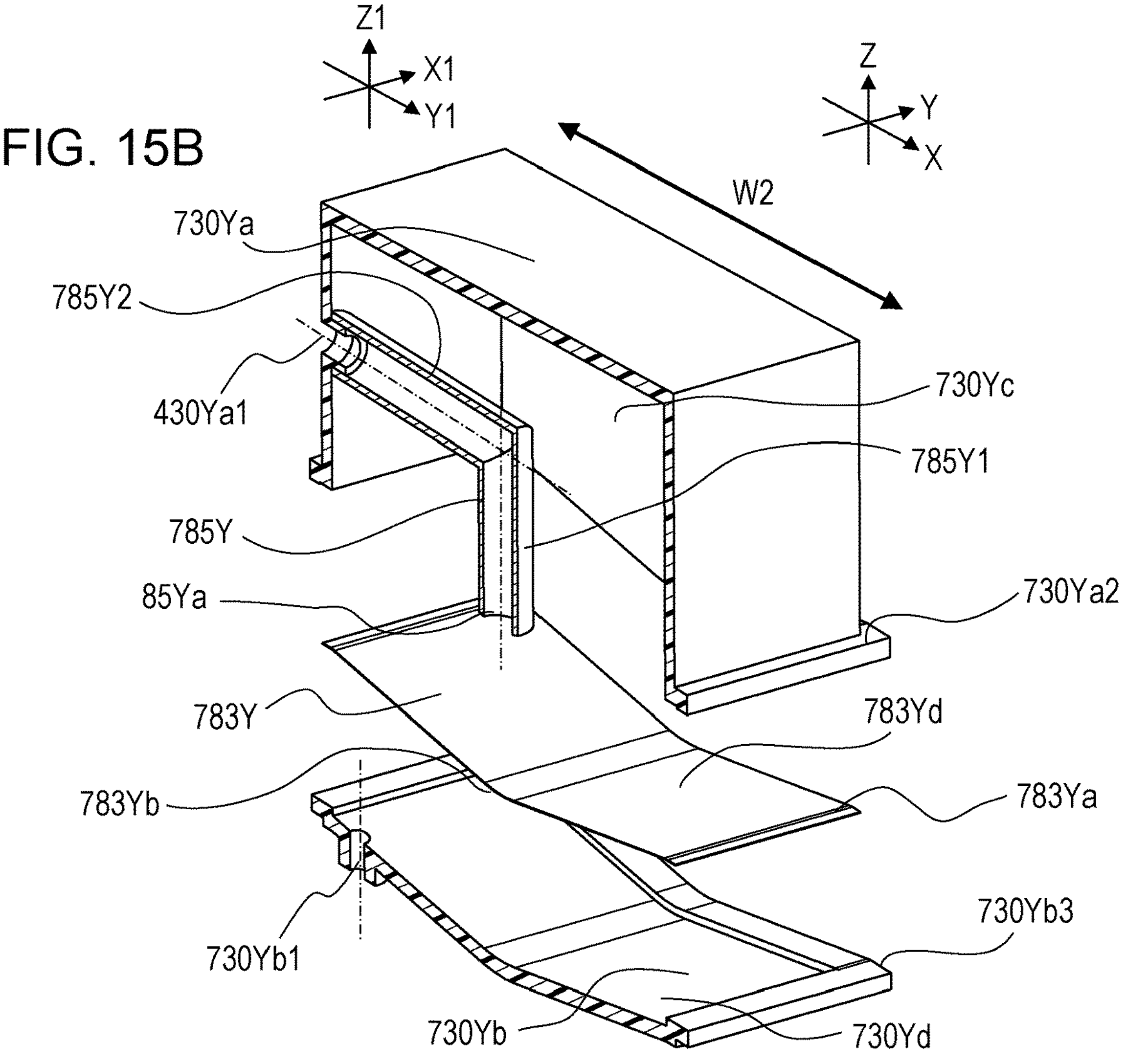
FIG. 15B is an exploded perspective view of the toner cartridge in FIG. 15A taken along XVB-XVB.

FIG. 15A is a plan view of the toner cartridge 730Y. FIG. 15B is an exploded perspective view of the toner cartridge 730Y in FIG. 15A taken along XVB-XVB. As illustrated in FIGS. 15A and 15B, the toner cartridge 730Y (a cartridge)

includes a first frame 730Ya (a second container), a second frame 730Yb (a first container), a filter 783Y, and an exhaust pipe 785Y (a pipe). The internal space of the toner cartridge 730Y is partitioned by the filter 783Y into a toner container 730Yc (a second chamber) and an air chamber 730Yd (a first chamber). The air chamber 730Yd is disposed below the filter 783Y. The toner container 730Yc is disposed above the filter 783Y.

The first frame 730Ya includes a first flange 730Ya2. The second frame 730Yb includes a second flange 730Yb3. The first flange 730Ya2 and the second flange 730Yb3 are formed around the whole circumference of the toner cartridge 730Y. The filter 783Y is formed in a rectangular sheet-like shape and has an outer edge 783Ya held between the first flange 730Ya2 and the second flange 730Yb3.

The toner cartridge 730Y of this embodiment has substantially the same configuration as the configuration of the first embodiment in which the first frame 430Ya, the second frame 430Yb, and the filter 483Y are rotated 90 degrees around an axis extending in the Z1-direction. In this embodiment, the exhaust pipe 785Y includes a third pipe 785Y1 including an inlet 85Ya and extending in the Z1-direction or the direction of gravity G and a fourth pipe 785Y2 including an output connected to a discharge port 430Ya1 and extending in the Y1-direction. The exhaust pipe 785Y is bent at an intermediate point. The discharge port 430Ya1 is open in the longitudinal direction (Y1-direction) of the toner cartridge 730Y. The filter 783Y has a bottom surface 783Yd serving as a partition between the air chamber 730Yd and the toner container 730Yc and an outer edge 783Ya held between the first flange 730Ya2 and the second flange 730Yb3. The bottom surface 783Yd extends parallel to the lateral direction (X1-direction) over the entire region in the lateral direction (X1-direction).

Therefore, the outer edge 783Ya of the filter 783Y is held between the joining surface of the first flange 730Ya2 and the joining surface of the second flange 730Yb3. The first flange 730Ya2 and the second flange 730Yb3 are joined by ultrasonically welding the joining surfaces. The first flange 730Ya2 and the second flange 730Yb3 may be fixed to each other not only by ultrasonic welding but also by thermal welding, adhesives such as double-sided tape and a hot-melt adhesive, or screws.

By joining the first flange 730Ya2 and the second flange 730Yb3 together, the filter 783Y interposed between the first flange 730Ya2 and the second flange 730Yb3 is retained. Since the filter 783Y is retained by the first flange 730Ya2 and the second flange 730Yb3, the filter 783Y is held along the respective joining surfaces of the first flange 730Ya2 and the second flange 730Yb3.

In other words, the filter 783Y has a shape in which a single rectangular sheet is folded in a valley shape at the lowermost portion 783Yb (an opposing region) and does not have any complex three-dimensional irregular shape.

This allows for forming the filter 783Y with a sheet-like non-woven fabric such as resin fibers and eliminates the need for forming the filter 783Y into a three-dimensional shape by thermal pressing or the like.

The filter 783Y has an inclined surface that descends upstream or downstream in the Y1-direction, which is the longitudinal direction of the toner cartridge 730Y. The inlet 85Ya of the exhaust pipe 85Y is opposed to the lowermost portion 783Yb of the filter 783Y with a gap therebetween. When the amount of toner T remaining in the toner container 730Yc becomes low, the toner T fluidized by air moves along the slope of the filter 783Y and gathers to the lowermost portion 783Yb. In other words, the toner T in the toner container 730Yc can be guided to the inlet 85Ya of the exhaust pipe 785Y. The inclination of the filter 783Y in the longitudinal direction of the toner cartridge 730Y (Y-direction) allows for efficiently gathering the toner T to the lowermost portion 783Yb.

The black toner cartridge may be longer in the width in the Y-direction than the toner cartridges of the other colors, as described above (see FIG. 3A). If the width of the black toner cartridge in the Y-direction is larger than the length in the X-direction, the filter in the black toner cartridge and the joining surfaces may be inclined in the Y-direction, as in the first embodiment. In contrast, if the widths of the yellow, cyan, and magenta toner cartridges in the Y-direction are smaller than the lengths in the X-direction, the filters in the yellow, cyan, and magenta toner cartridges and the joining surfaces may be inclined in the X-direction, as in the fourth embodiment. The toner cartridges of the individual colors may have a combination of the configuration of the first embodiment and the configuration of the fourth embodiment.

OTHER EMBODIMENTS

Although the above embodiments are configured such that the filter does not protrude from the first frame and the second frame of the toner cartridge, this configuration is illustrative only. For example, the filter may protrude outward from the first frame and the second frame of the toner cartridge.

Embodiments of the present disclosure provides a cartridge that supplies toner with air and an image forming apparatus including the same.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-166578 filed Sep. 27, 2023, which is hereby incorporated by reference herein in its entirety.

What is claimed is:

1. A cartridge comprising:

a first container including a container opening communicating with outside of the cartridge;

a filter constituting a first chamber together with the first container, the filter being configured to prevent passage of toner and permit passage of air;

a second container constituting a second chamber for housing toner together with the filter; and a pipe including a first pipe opening that faces a predetermined region of the filter with a gap therebetween and opens toward the predetermined region of the filter and a second pipe opening communicating with the outside of the cartridge, the pipe extending from the first pipe opening to the second pipe opening, wherein the filter includes a partition between the first chamber and the second chamber and a sandwiched portion sandwiched between the first container and the second container, wherein, with a direction in which the first container and the second container align defined as a first direction, and directions perpendicular to each other on a cross-section perpendicular to the first direction defined as a second direction and a third direction, the first direction being a direction of gravity, in a case where the cartridge is oriented in a predetermined direction in which the second chamber is above the first chamber, one of the first container and the second container includes an inclined surface that is inclined toward the predetermined region of the filter located lower in the first direction, as viewed in the third direction, as the inclined surface approaches the predetermined region in the second direction, the other of the first container and the second container includes a sandwiching surface, and the sandwiched portion of the filter includes a first sandwiched part extending in the second direction, the first sandwiched part being sandwiched between the inclined surface and the sandwiching surface along the inclined surface.

2. The cartridge according to claim 1, wherein, in the case where the cartridge is oriented in the predetermined direction, the sandwiching surface is inclined along the inclined surface in the second direction as viewed in the third direction.

3. The cartridge according to claim 1, wherein, with the inclined surface defined as a first inclined surface, and the sandwiching surface defined as a first sandwiching surface, in the case where the cartridge is oriented in the predetermined direction, the one of the first container and the second container includes a second inclined surface that is disposed on an opposite side of the predetermined region with respect to the first inclined surface in the second direction as viewed in the third direction, the second inclined surface extends downward toward the predetermined region located lower in the first direction, as the second inclined surface approaches the predetermined region in the second direction, the other of the first container and the second container includes a second sandwiching surface, and the sandwiched portion of the filter includes a second sandwiched part extending in the second direction as viewed in the first direction, the second sandwiched part being sandwiched between the second inclined surface and the second sandwiching surface along the second inclined surface.

4. The cartridge according to claim 3, wherein, in the case where the cartridge is oriented in the predetermined direction, the second sandwiching surface is inclined along the second inclined surface in the second direction as viewed in the third direction.

5. The cartridge according to claim 3, wherein, in the case where the cartridge is oriented in the predetermined direction, the one of the first container and the second container includes an intermediate surface between the first inclined surface and the second inclined surface in the second direction as viewed in the third direction, the other of the first container and the second container includes an intermediate sandwiching surface, and the sandwiched portion of the filter includes an intermediate sandwiched part extending in the second direction as viewed in the first direction, the intermediate sandwiched part being sandwiched between the intermediate surface and the intermediate sandwiching surface along the intermediate surface.

6. The cartridge according to claim 1, wherein a longitudinal direction of the second container is the second direction.

7. The cartridge according to claim 1, wherein, in the case where the cartridge is oriented in the predetermined direction, the one of the first container and the second container includes a flat surface extending in the third direction so that a distance between the first pipe opening and the flat surface in the first direction is constant as viewed in the second direction, the other of the first container and the second container includes a third sandwiching surface, and the sandwiched portion of the filter includes a third sandwiched part extending in the third direction as viewed in the first direction, the third sandwiched part being sandwiched between the flat surface and the third sandwiching surface along the flat surface.

8. The cartridge according to claim 7, wherein, in the case where the cartridge is oriented in the predetermined direction, the flat surface is located above the first pipe opening.

9. The cartridge according to claim 1, wherein, in the case where the cartridge is oriented in the predetermined direction, the first pipe opening opens downward, and the second pipe opening is located above the first pipe opening.

10. The cartridge according to claim 1, wherein, in the case where the cartridge is oriented in the predetermined direction, the partition of the filter extends parallel to the third direction over an entire region in the third direction.

11. The cartridge according to claim 1, wherein the sandwiched portion continues to the partition.

12. The cartridge according to claim 1, wherein the container opening is disposed at a position different from the predetermined region of the filter in the second direction.

13. The cartridge according to claim 1, wherein, in the case where the cartridge is oriented in the predetermined direction, the predetermined region is located at a lowermost portion of the filter.

14. The cartridge according to claim 1, wherein the filter is a flat sheet in a state in which the sandwiched portion is not sandwiched between the first container and the second container.

15. The cartridge according to claim 1, wherein the filter includes a sheet-like non-woven fabric.

16. An image forming apparatus comprising:

an apparatus body;

the cartridge according to claim 1, the cartridge being detachably supported by the apparatus body; and a process cartridge configured to be supplied with toner from the cartridge.

17. The cartridge according to claim 12, wherein, in the case where the cartridge is oriented in the predetermined direction, the container opening is disposed at a position different from a lowermost portion of the first container in the second direction.

18. The cartridge according to claim 17, wherein, in the case where the cartridge is oriented in the predetermined direction, the container opening is formed in a protrusion which protrudes downward and which is provided on a bottom surface of the first container.

19. The cartridge according to claim 1, wherein the cartridge is detachably attached to an apparatus body of an image forming apparatus, the apparatus body including a pump unit having an ejection port, and wherein the container opening is configured to communicate with the ejection port of the pump unit when the cartridge is attached to the apparatus body.

* * * * *